(12) United States Patent
Paul et al.

(10) Patent No.: US 10,988,916 B2
(45) Date of Patent: Apr. 27, 2021

(54) HANDLING SYSTEM FOR GROUND-ENGAGING WEAR PARTS SECURED TO EARTH WORKING EQUIPMENT

(71) Applicant: ESCO Corporation, Portland, OR (US)

(72) Inventors: David M. Paul, Corbett, OR (US); Rodney K. Clarke, Cleveland (AU); Christopher M. Carpenter, Tualatin, OR (US); Noah D. Cowgill, Portland, OR (US); Taylor M. Finley, Lake Oswego, OR (US); Ryan J. Carpenter, Portland, OR (US)

(73) Assignee: ESCO GROUP LLC, Portland, OR (US)

( * ) Notice: Subject to any disclaimer, the term of this patent is extended or adjusted under 35 U.S.C. 154(b) by 208 days.

(21) Appl. No.: 15/621,921

(22) Filed: Jun. 13, 2017

(65) Prior Publication Data
US 2017/0356167 A1    Dec. 14, 2017

Related U.S. Application Data

(60) Provisional application No. 62/349,344, filed on Jun. 13, 2016.

(51) Int. Cl.
*E02F 9/28* (2006.01)
*B25J 15/00* (2006.01)
(Continued)

(52) U.S. Cl.
CPC ............. *E02F 9/2891* (2013.01); *B25J 5/007* (2013.01); *B25J 11/005* (2013.01);
(Continued)

(58) Field of Classification Search
CPC ..... E02F 9/2891; E02F 9/2833; B25J 19/023; B25J 5/007; B25J 15/0052; B25J 15/024;
(Continued)

(56) References Cited

U.S. PATENT DOCUMENTS 2,546,037 A    6/1947  Freiheit
2,807,105 A    9/1957  Launder
(Continued)

FOREIGN PATENT DOCUMENTS

CN     202071702    12/2011
EA     0013772      4/2009
(Continued)

OTHER PUBLICATIONS

Zhang et al., The Challenges of Integrating an Industrial Robot on a Mobile Platform, IEEE Intl Conf. on Automation & Logistics, Hong Kong and Macau, Aug. 16-20, 2010.

*Primary Examiner* — Rick K Chang
(74) *Attorney, Agent, or Firm* — Steven Schad; Palmer Dzurella

(57) ABSTRACT

A handling system for handling ground-engaging wear parts used on earth working equipment includes handling tools to remove and handle wear parts from equipment and/or to install new wear parts. The tools can include a torque or other tool to engage and/or disengage a lock retained by the wear member. The handling system allows an operator maintain a distance from heavy parts being removed or installed, reducing the risk of injury.

18 Claims, 24 Drawing Sheets

(51) Int. Cl.
  *B25J 11/00* (2006.01)
  *B25J 19/02* (2006.01)
  *B25J 15/04* (2006.01)
  *B25J 15/02* (2006.01)
  *B25J 5/00* (2006.01)

(52) U.S. Cl.
  CPC ........ *B25J 15/0019* (2013.01); *B25J 15/0028* (2013.01); *B25J 15/0052* (2013.01); *B25J 15/024* (2013.01); *B25J 15/0491* (2013.01); *B25J 19/023* (2013.01); *E02F 9/2833* (2013.01)

(58) Field of Classification Search
  CPC ................ B25J 15/0491; B25J 15/0028; B25J 15/0019; B25J 11/005
  See application file for complete search history.

(56) References Cited

U.S. PATENT DOCUMENTS

| | | | |
|---|---|---|---|
| 3,927,778 A | 12/1975 | Zrostlik | |
| 4,791,738 A * | 12/1988 | Briscoe | E02F 3/60 37/399 |
| 5,022,812 A | 6/1991 | Coughlan et al. | |
| 5,210,919 A | 5/1993 | Garman | |
| 5,259,721 A | 11/1993 | Sato et al. | |
| 5,410,478 A | 4/1995 | Richard et al. | |
| 5,584,646 A | 12/1996 | Lewis et al. | |
| 5,672,044 A | 9/1997 | Lemelson | |
| 5,937,551 A | 8/1999 | Moehnke et al. | |
| 6,477,730 B1 | 12/2002 | Marrero | |
| 6,671,582 B1 | 12/2003 | Hanley | |
| 7,600,460 B2 | 10/2009 | Manders | |
| 8,381,501 B2 | 2/2013 | Koselka et al. | |
| 8,413,747 B2 | 4/2013 | Beard et al. | |
| 8,583,313 B2 | 11/2013 | Mian | |
| 9,194,666 B2 | 11/2015 | Dennis et al. | |
| 2008/0008546 A1 | 1/2008 | Dietens et al. | |
| 2009/0035107 A1 | 2/2009 | Duran et al. | |
| 2009/0121061 A1 | 5/2009 | Salamanca | |
| 2009/0155032 A1 | 6/2009 | Hedley et al. | |
| 2010/0057254 A1 | 3/2010 | Salamanca | |
| 2010/0068024 A1 | 3/2010 | Agens | |
| 2010/0179691 A1 | 7/2010 | Gal et al. | |
| 2011/0197416 A1 | 8/2011 | Hedley | |
| 2012/0102703 A1 | 5/2012 | Salamanca | |
| 2012/0298706 A1 | 11/2012 | Gordon et al. | |
| 2013/0011234 A1 | 1/2013 | Pretlove et al. | |
| 2013/0104361 A1 | 5/2013 | Corfitsen | |
| 2013/0231777 A1 | 9/2013 | Salamanca | |
| 2013/0231779 A1 | 9/2013 | Purkayastha et al. | |
| 2013/0268118 A1 | 10/2013 | Grinstead et al. | |
| 2015/0107075 A1 * | 4/2015 | Clarke | E02F 9/2816 29/402.08 |
| 2015/0368884 A1 | 12/2015 | Cheyne et al. | |
| 2016/0065901 A1 | 3/2016 | Padate et al. | |

FOREIGN PATENT DOCUMENTS

| | | |
|---|---|---|
| EP | 1522636 | 4/2005 |
| EP | 2559815 | 3/2014 |
| JP | H08-120710 A | 5/1996 |
| RU | 2016756 | 7/1994 |
| RU | 71141 U1 | 7/1998 |
| SU | 1735512 | 5/1992 |
| WO | WO 1999039651 | 2/1998 |
| WO | WO 2007/149295 | 12/2007 |
| WO | WO 2014153591 | 10/2014 |

* cited by examiner

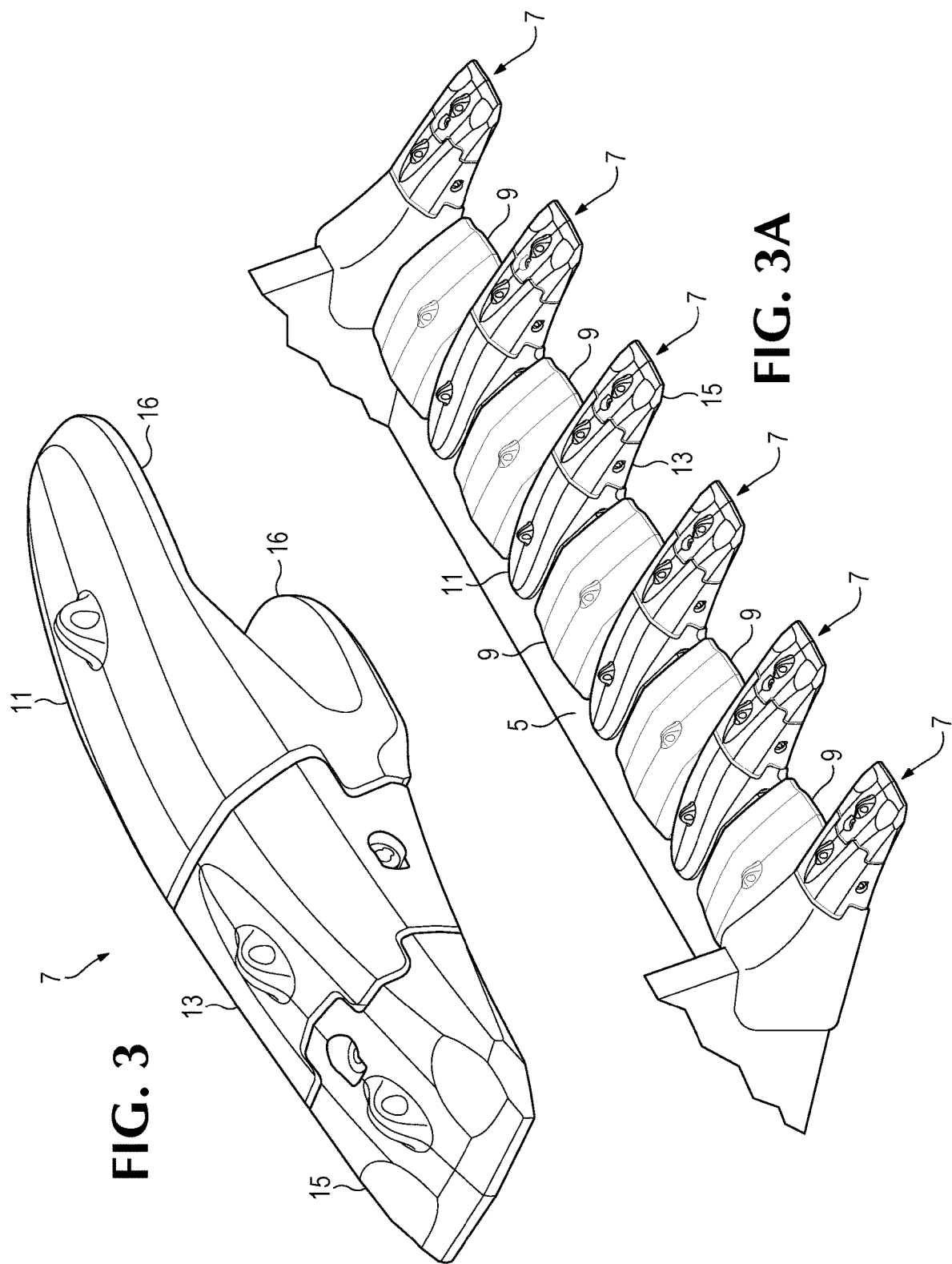

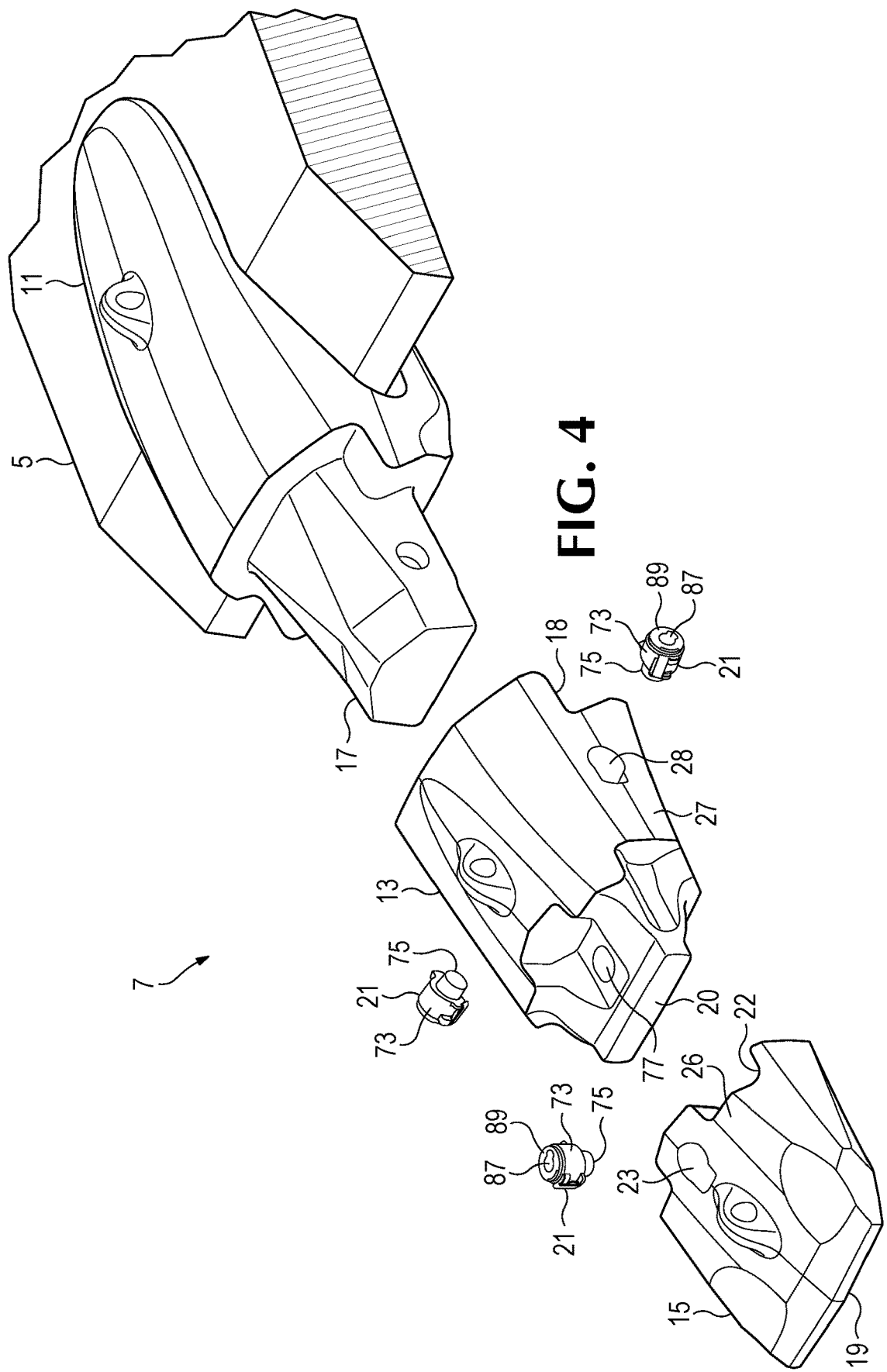

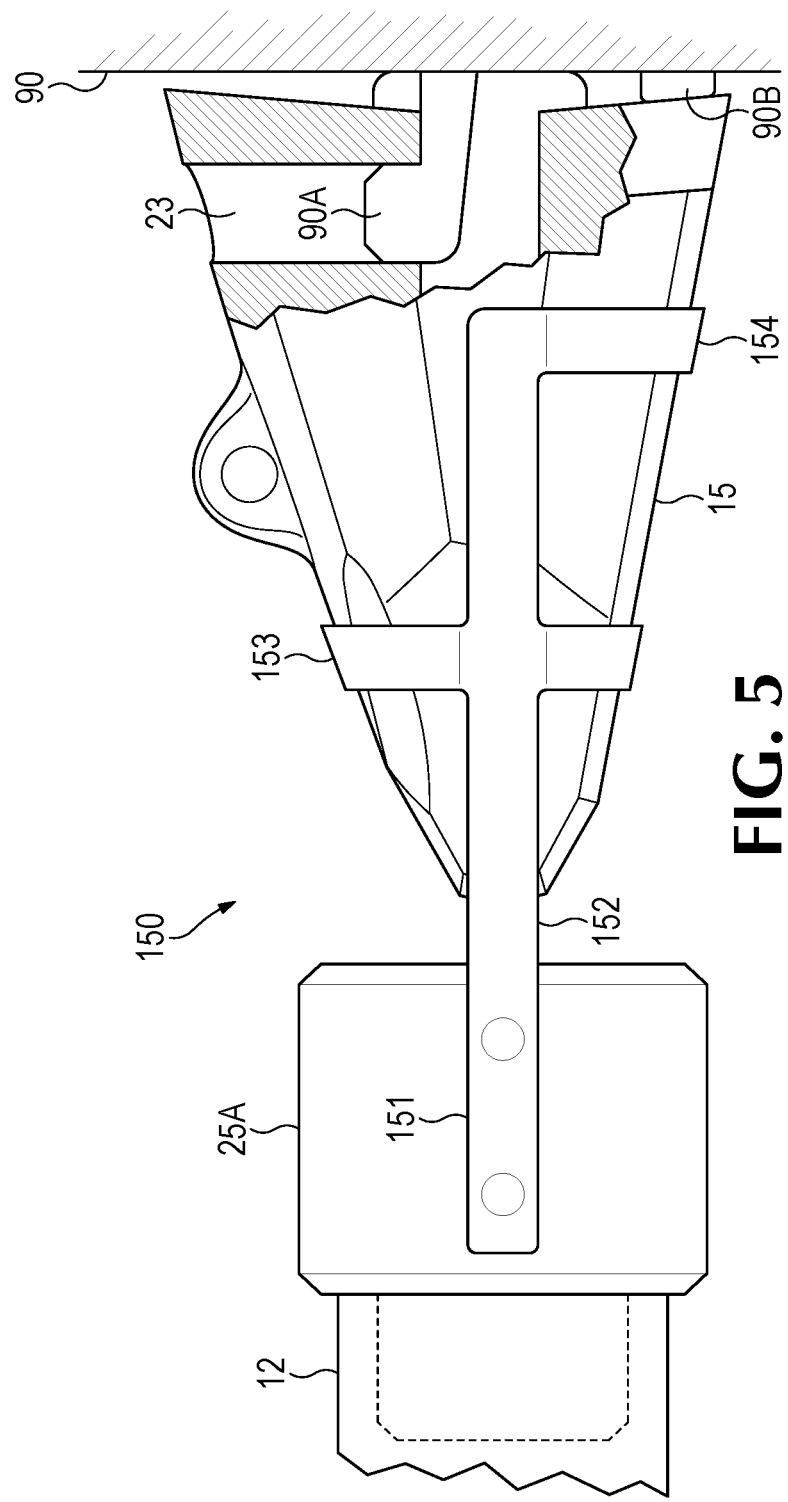

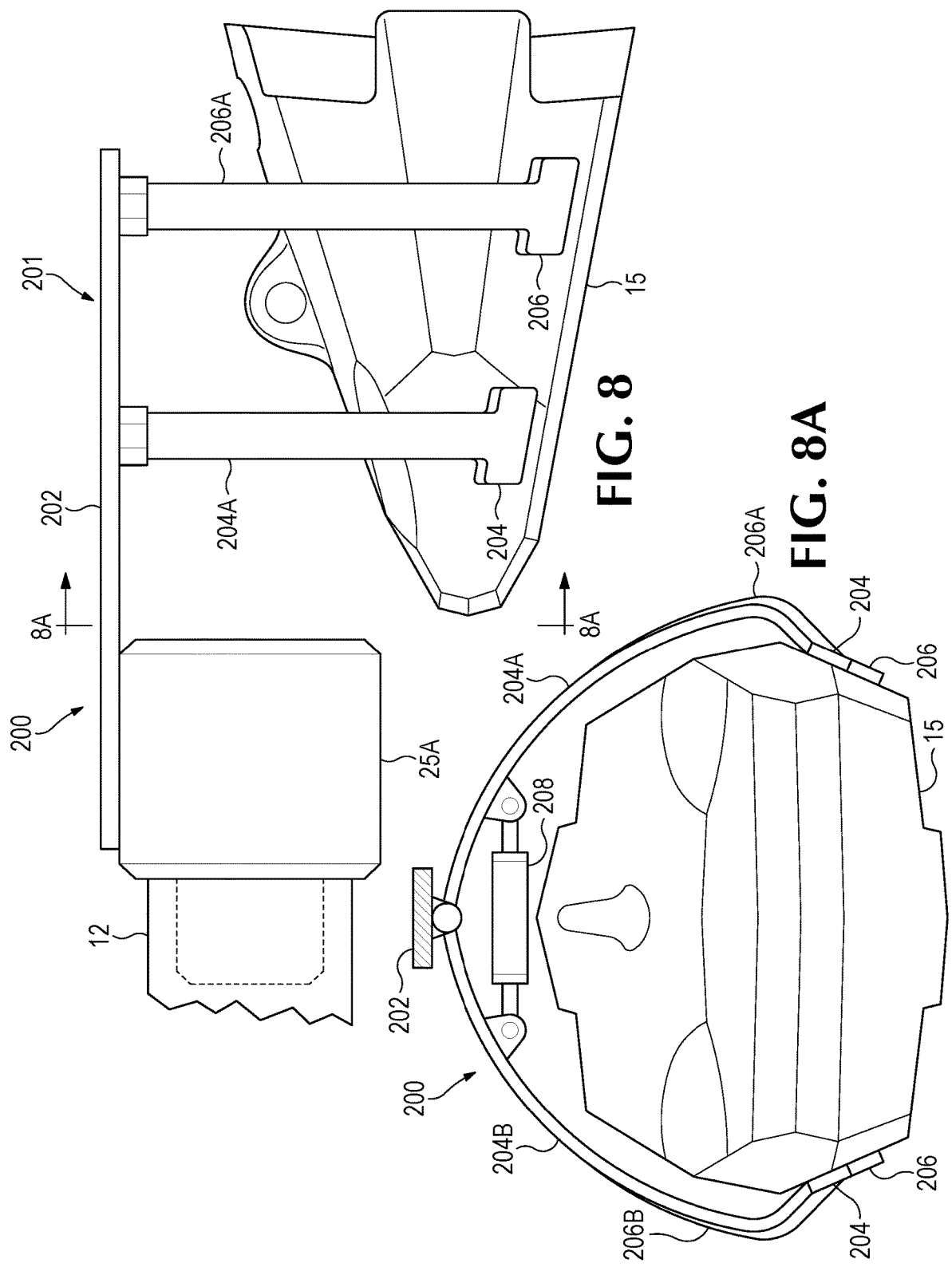

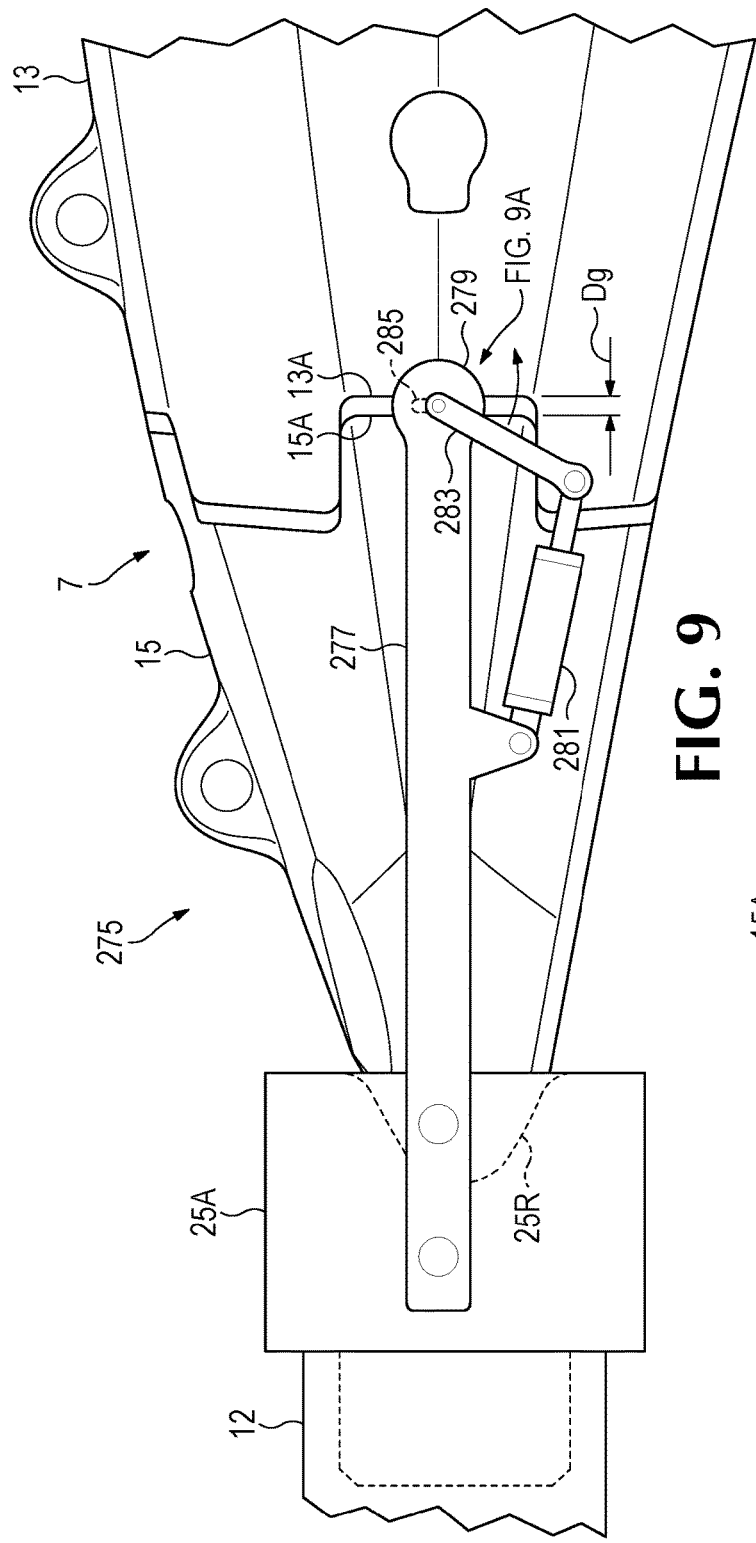
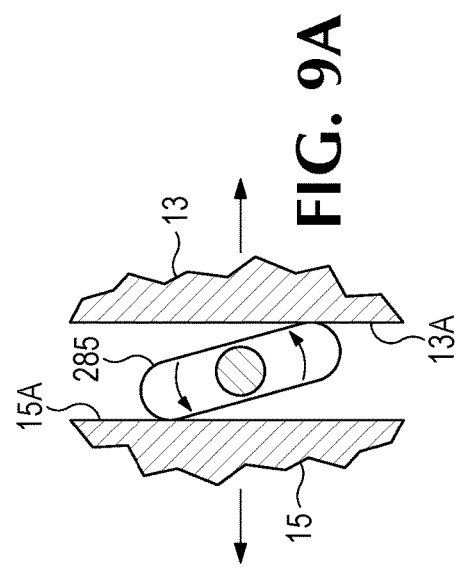
FIG. 9
FIG. 9A

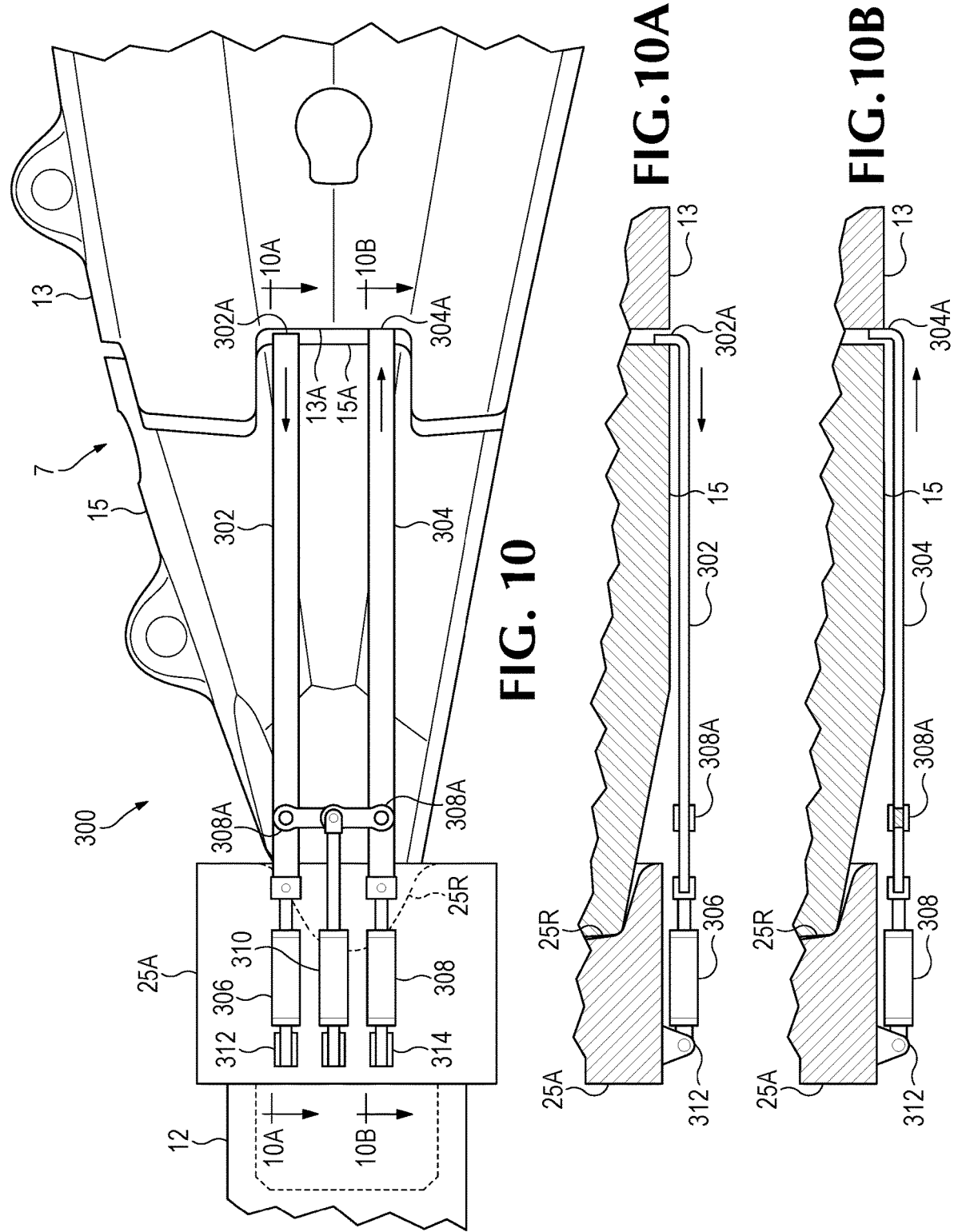

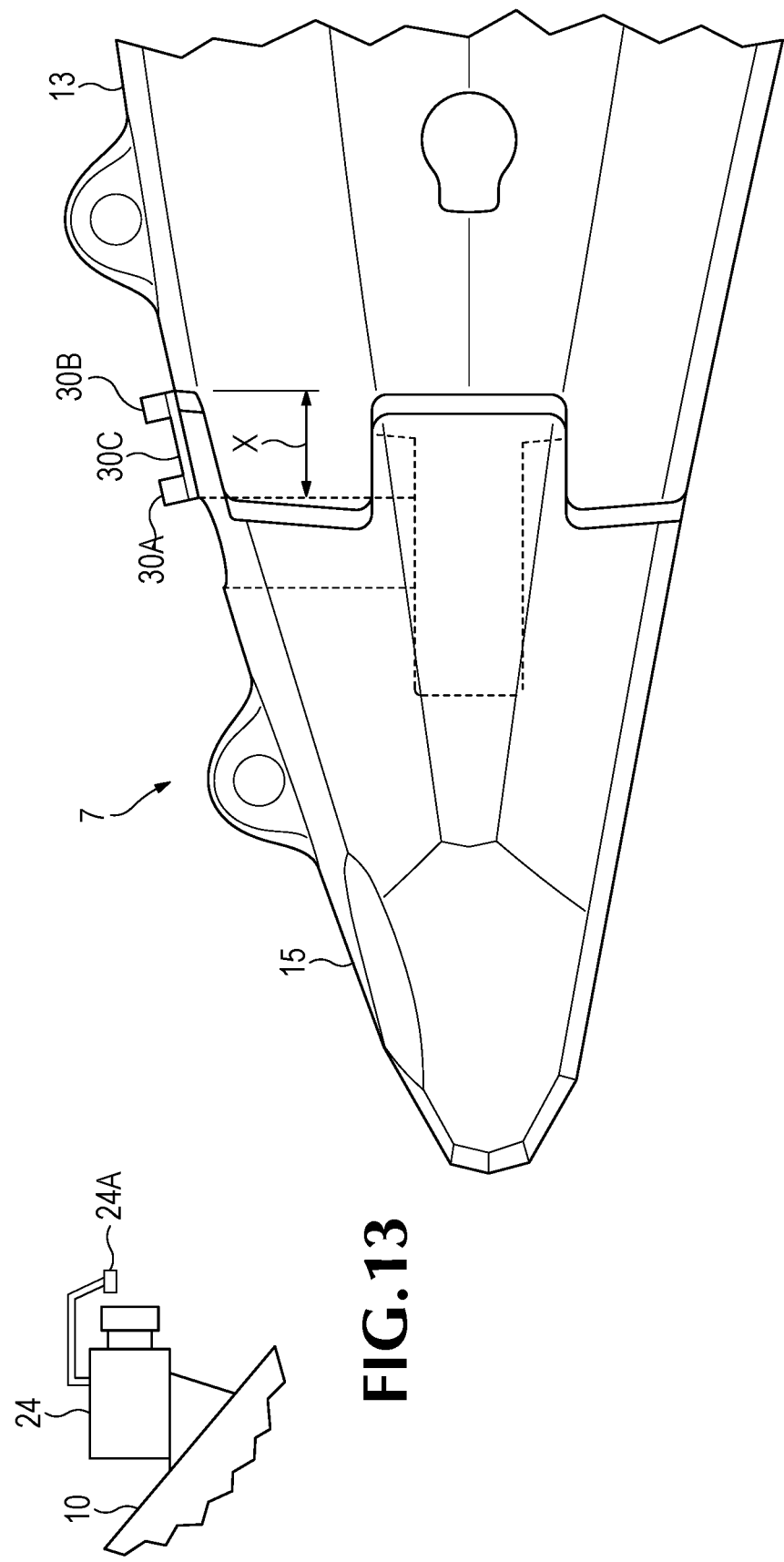

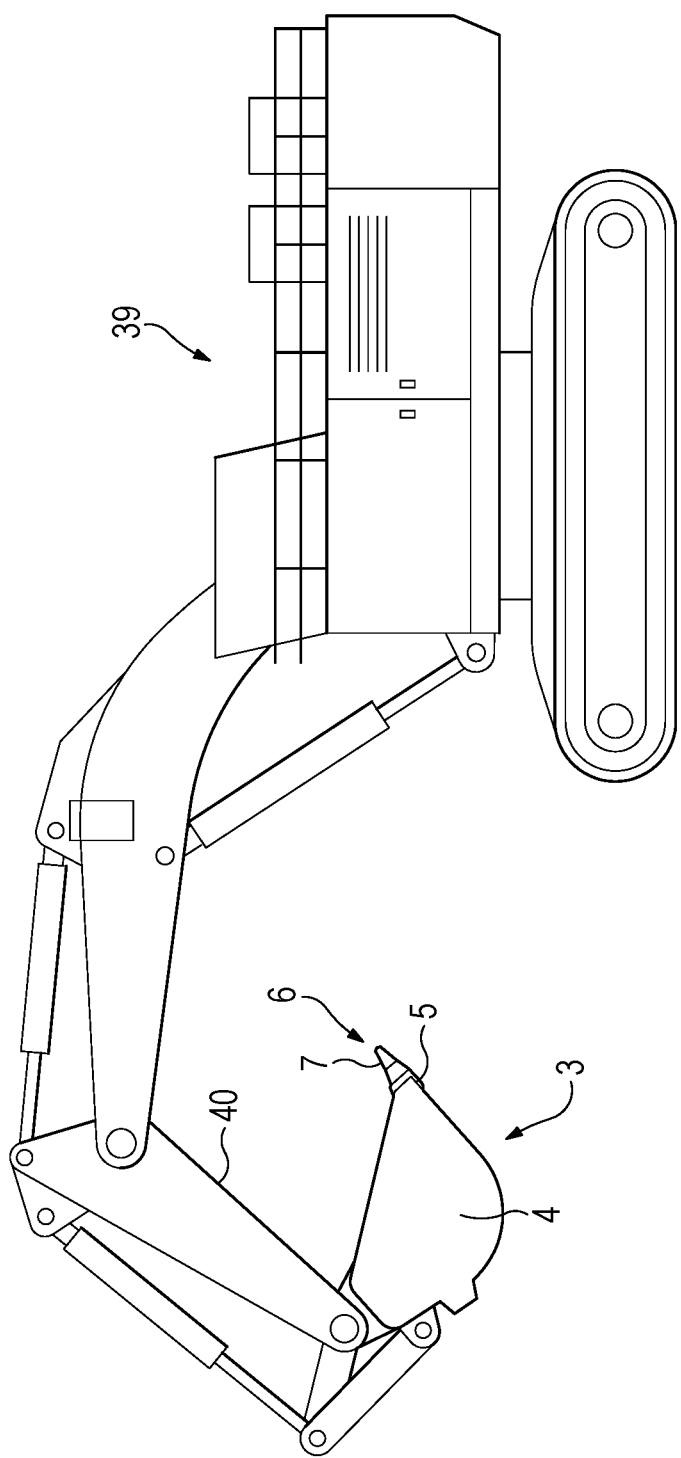

HANDLING SYSTEM FOR GROUND-ENGAGING WEAR PARTS SECURED TO EARTH WORKING EQUIPMENT

RELATED APPLICATIONS

This application claims priority to U.S. Provisional Patent Application No. 62/349,344, filed Jun. 13, 2016, entitled "Handling Tool for Ground-Engaging Wear Parts Secured to Earth Working Equipment," which is incorporated by reference in its entirety herein and made a part hereof

FIELD OF THE INVENTION

This disclosure pertains to a handling system for handling ground-engaging wear parts such as ground engaging tools (GET) secured to earth working equipment, and to processes for removing and installing such wear parts.

BACKGROUND OF THE INVENTION

In mining and construction, ground-engaging wear parts (e.g., tips and shrouds) are commonly provided along the digging edge of earth working equipment such as buckets for dragline machines, cable shovels, face shovels, hydraulic excavators, loaders, bucket wheel excavators, and the like. These wear parts protect the underlying equipment from undue wear and, in some cases, perform other functions such as breaking up the ground ahead of the digging edge. During use, these wear parts can encounter heavy loading and highly abrasive conditions. As a result, they must be periodically replaced.

These wear parts are commonly mounted on a base that is secured to the earth working equipment (e.g., along the digging edge), with the wear part secured to the base to engage the ground. The wear part tends to wear out more quickly and is typically replaced a number of times before the base (which can also be a replaceable wear part) must also be repaired or replaced. One example of such a wear part is the tip of an excavating tooth that is attached to the lip of a bucket for an earth working machine. A tooth typically includes an adapter secured to the lip of a bucket as the base, and a tip or point attached to the adapter to initiate contact with the ground. A pin or other kind of lock is used to secure the point to the adapter.

There are a number of challenges and hazards associated with the removal and installation of ground-engaging wear parts for earth working equipment. The wear parts can be large, heavy and/or unwieldy leading to difficulty and/or hazards in lifting, holding and/or manipulating the wear part during removal and installation. Worn parts can also be non-uniform from each other. Maintenance of wear parts requires support equipment of heavy tools and transport which can pose risk of injury especially when used in adverse conditions (e.g., extreme heat or cold, rain, snow, sleet, darkness, etc.). These risks can be exacerbated on account of lifting features such as lifting eyes being worn away, complex geometries of the parts, space constraints, orientation of parts, complicated or unstable rigging for securing the parts to a hoist, heavy gloves worn by workers, impacted earthen fines, hammers needed for removal and installation, etc.

SUMMARY OF THE INVENTION

This disclosure pertains to a handling system for handling ground-engaging wear parts used with earth working equipment (e.g., excavating equipment). The handling system can facilitate an easy, quick and/or safe removal and/or installation of ground-engaging wear parts, and/or other handling of the wear parts.

In one embodiment, a handling system for ground-engaging wear parts for earth working equipment includes a handling tool with a pair of movable arms to grip and release a rear portion of the wear part, and a support to engage and underlie a front portion of the wear part. A manipulator supports and moves the handling tool to engage the wear part, and install and/or remove the wear part onto or from the earth working equipment. A controller controls the movements of the handling tool and the manipulator.

In another embodiment, a handling system for ground-engaging wear parts for earth working equipment includes a plurality of discrete handling tools each of which includes a gripping assembly to grip and release a wear part, a manipulator having a connector to separately engage and move each of the handling tools to engage a wear part for installing and/or removing the wear part onto or from a base, and a controller to control the movements of the manipulator and the handling tools.

In another embodiment, a handling system for ground-engaging wear parts for earth working equipment includes a handling tool including opposing bearing surfaces for engaging a nose on the wear part and a support for engaging and releasing a lock opening in the nose. A manipulator supports and moves the handling tool to engage the wear part, and install and/or remove the wear part onto or from a base. A controller controls the movements of the handling tool and the manipulator.

In another embodiment, a method for removing ground-engaging wear parts mounted on a base of earth working equipment includes connecting one of a plurality of discrete handling tools each including a gripping assembly to grip and release a wear part to a manipulator, operating the manipulator to place the connected handling tool proximate the wear part, operating the connected handling tool to engage the wear part, moving a lock securing the wear part to the base to release the base, and operating the manipulator to pull the wear part engaged by the handling tool from the earth working equipment.

In another embodiment, a method of removing a ground-engaging wear part mounted on a base secured to earth working equipment includes operating a manipulator having a handling tool so the handling tool is proximate the wear part, operating the handling tool having arms and a support such that the arms grip a rear portion of the wear part and the support engages and underlies a front portion of the wear part, moving a lock that secures the wear part to the base to release the base after the handling tool has gripped the wear part, and operating the manipulator to pull the handling tool with the wear part from the base.

In another embodiment, a method of removing a ground-engaging wear part mounted on a base secured to earth working equipment includes operating a manipulator having a handling tool so the handling tool is proximate the wear part, operating the handling tool having bearing surfaces to engage a nose on the wear part and a support to engage a lock opening in the nose, moving a lock that secures the wear part to the base to release the base after the handling tool has gripped the wear part, and operating the manipulator to pull the handling tool with the wear part from the base.

In another embodiment, a method for replacing ground-engaging worn wear parts mounted on bases of earth working equipment includes connecting one of a plurality of discrete handling tools each including a gripping assembly to hold and release wear parts, operating the manipulator to place the connected handling tool proximate a worn wear part on a base of earth working equipment, operating the connected handling tool to engage and hold the worn wear part, moving a lock securing the worn wear part to the base to release the worn wear part, operating the manipulator to pull the worn wear part engaged by the handling tool from the earth working equipment, releasing the worn wear part from the handling tool, operating the manipulator to place the handling tool proximate a new wear part, operating the handling tool to engage and hold the new wear part, moving a lock to secure the new wear part to the base, and operating the handling tool to release the new wear part on the base of the earth working equipment.

In another embodiment, a method for removing ground-engaging wear parts mounted on a base of earth working equipment includes manually operating a manipulator having an operator force multiplier and a handling tool to place the handling tool proximate a wear part on earth working equipment, actuating the handling tool to securely hold the wear part, moving at least one lock holding the wear part to the earth working equipment to release the earth working equipment, and manually operating the manipulator to move the wear part held by the handling tool away from the earth working equipment after the lock is moved.

In another embodiment, a method for replacing ground-engaging wear parts mounted on a base of earth working equipment includes manually operating a manipulator having an operator force multiplier and a handling tool to place the handling tool proximate a worn wear part on earth working equipment, actuating the handling tool to securely hold the worn wear part, moving at least one lock holding the worn wear part to the earth working equipment to release the earth working equipment, manually operating the manipulator to move the worn wear part held by the handling tool away from the earth working equipment, releasing the worn wear part from the handling tool, manually operating the manipulator to place the handling tool proximate a new wear part, actuating the handling tool to securely hold the new wear part, manually operating the manipulator to place the new wear part held by the manipulator in position on the earth working equipment, moving at least one lock to hold the new wear part to the earth working equipment, and releasing the new wear part from the handling tool.

In another embodiment, a handling system for ground-engaging wear parts for earth working equipment includes a manually-operated manipulator incorporating an operator force multiplier, and a handling tool connected to the manipulator and having a gripping assembly to hold and release a wear part for removal and/or installation of the wear part from and/or onto earth working equipment. In one embodiment, the manipulator is an intelligent assist device. In another embodiment, the manipulator includes a tool balancer.

In another embodiment, a handling system for ground-engaging wear parts for earth working equipment includes a crane, a rigging system with a tool balancer as a vertical operator force multiplier, and a handling tool with arms to grip and release the wear part.

In another embodiment, a handling system includes a handling tool to remove a wear part from a base including arms with bearing surfaces to engage surfaces transverse to an axis of the wear part, and a support to engage a front portion of the wear part. An actuator displaces one of the bearing surface and the thrust surface to exert an axial compressive force to the wear part. In another embodiment, the handling system pulls the handling tool axially to separate the wear part from the base.

In another embodiment, a handling system to position a wear part includes an articulated arm with a handling tool to position the wear part and a crane to support the wear part. The handling system can include a rigging tool between the crane and wear part to engage the handling tool.

In another embodiment, a handling system includes an articulated arm that engages a plurality of tools, each tool performing a distinct function in separating a wear part from a base. In another embodiment, the articulated arm and the tool each includes a corresponding power connector that supplies power to the tool on engaging the arm to the tool.

In another embodiment, a handling system for replacing wear parts on earth working equipment includes an image processing system that collects images of a wear part and determines coordinates of a datum point on the wear part. In another embodiment the image processing system determines coordinates of two datum points a known distance apart. In another embodiment the datum are positioned on the wear part by an operator. In another embodiment, the datum are retroflectors.

In another embodiment, a handling system to separate a worn wear part from an adjacent member comprises an articulated arm and a handling tool that connects to the arm, the handling tool with a prying tool and the handling tool rotates the prying tool in a gap between a wear part and the adjacent member to separate the wear part from the adjacent member.

In another embodiment, a handling system to separate a worn wear part from an adjacent member comprises an articulated arm and a handling tool that connects to the arm, the handling tool including rearward extending arms with bearing surfaces and actuators connected to the arms to bear on the wear part and an adjacent part in opposite directions to separate the wear part from the adjacent part. In another embodiment, the handling system deposits the separated wear part in a bin of a support vehicle that can be tipped to recycle the parts.

In another embodiment, a handling system to support a wear part includes an articulated arm and a handling tool to connect to the arm, the handling tool with a bearing surface to engage the nose of the wear part, rearwardly extending arms that engage the wear part and a torque tool to engage and turn a threaded lock component.

In another embodiment, a handling system includes a rack for dispensing wear parts that includes a rotating carousel with multiple tool heads holding wear parts at radial positions, an actuator to rotate the carousel and a controller connected to the actuator to rotate the carousel and position a wear part at an indexed position for retrieval. In another embodiment, the handling system includes an articulated arm that returns to the indexed position to access the indexed position of the carousel.

In another embodiment, a handling system for removing a wear part from earth working equipment includes a handling tool to rotate a threaded component of the wear part and a handling tool to support a wear part. In another embodiment, the handling tool to rotate a threaded component inserts a torque tool in a recess of the threaded component. In another embodiment, a handling tool turns a prying tool in a gap between the wear part and an adjacent member. In another embodiment, an articulated arm engages the handling tool.

In another embodiment, a handling system for removing a wear part from earth working equipment includes a handling tool to support the wear part, and the wear part includes a communications device that transfers data to the tool with the tool gripping the wear part.

In another embodiment, a method for removing a wear part includes sending a command from a remote control to a processor of a handling system, receiving the command at the processor, implementing the command at an actuator of a handling tool and grasping the wear part with arms connected to the actuator.

In another embodiment, a handling system for wear parts comprises a manipulator as an operator force multiplier and a handling tool connected to the manipulator with arms to grasp a wear part. In another embodiment, a handling system for wear parts comprises a crane, a rigging system with a tool balancer as a vertical operator force multiplier and a handling tool with arms to grip and release a rear portion of the wear part.

In another embodiment, the handling tool can include a plurality of discrete tool heads operable to handle different ground-engaging wear parts. In one embodiment, the handling tool includes one tool head for tips and a second tool head for adapters. In another embodiment, the handling tool includes one tool head for handling a wear part of one size, and a second tool head for handling a wear part of a different size. In another embodiment, one tool head is for points and another tool head for shrouds. Other arrangements are possible, including handling tools with virtually any number of tool heads.

In another embodiment, the handling tool includes a turntable to facilitate easy positioning of multiple handling tool heads to engage a wear part.

In another embodiment, the handling tool includes a chassis and at least one tool head for handling ground-engaging wear parts that is resiliently coupled to the chassis. This resilient coupling provides a freedom of motion that eases engagement with the wear part and/or accommodates imprecision in the primary manipulator supporting the tool.

In another embodiment, the handling tool includes a support for holding a ground-engaging wear part by a prominent feature such as a nose or a front portion of a tip provided to support another wear part. In one embodiment, the support defines a cavity into which the nose is received, and a retainer to resist removal of the nose from the support.

In another embodiment, the handling tool is operated remotely by a worker so that handling of the wear parts can occur without the worker contacting the part and keeping the worker spaced a suitable distance from the wear parts to reduce the risk of injury.

In another embodiment, the handling tool can include a connector suitable for common attachment to the stick of an excavator or other manipulator (e.g., a truck-mounted hydraulic crane). The use of such a connector permits easy and generally universal use of the handling tool at mines and construction sites.

In another embodiment, the handling tool can include at least one tool head for securely holding a ground-engaging wear part, and a coupling for securing a ground-engaging wear part by rigging or a lifting eye. This combination of features provides versatility to engage, manipulate and move the wear parts. In one embodiment, the coupling is recessed within the bottom of handling tool to permit easy connection to the wear parts without disrupting the ability of the handling tool to set stably on the ground.

The above-noted aspects, embodiments and examples can be used independently or collectively with two or more of them together. To gain an improved understanding of the advantages and features of the aspects of the invention, reference may be made to the following descriptive matter and accompanying figures that describe and illustrate various configurations and concepts related to this disclosure.

BRIEF DESCRIPTION OF THE DRAWINGS

FIG. 3 is a perspective view of a ground engaging tool.

FIG. 3A is a perspective view of a lip of the bucket with ground engaging tools attached.

FIG. 4 is an exploded perspective view of the tooth on the lip of the bucket.

FIG. 5 is a side elevation of a handling tool supporting an excavating tooth.

FIG. 8 is a side elevation of a handling tool supporting an excavating tooth.

FIG. 8A is a section view of the handling tool of FIG. 8 at A-A.

FIG. 9 is a side elevation view of an extractor tool and an excavating tooth.

FIG. 9A is a detail view of the extractor tool of FIG. 9 at A.

FIG. 10 is a side elevation view of an extractor tool.

FIG. 10A is a section view of the extractor tool of FIG. 10 at A-A.

FIG. 10B is a section view of the extractor tool of FIG. 10 at B-B.

FIG. 13 is a side elevation view of a camera and a wear assembly with datum points.

FIG. 19 is a side view of an excavator.

DETAILED DESCRIPTION OF THE INVENTION

The present disclosure pertains to a handling system for handling ground-engaging wear parts used on earth working equipment, and to processes for removing and/or installing such wear parts, and/or other handling of the wear parts. The handling system provides advantages in speed, ease and/or safety in the handling of the wear parts. The system can be used to install and/or remove a wide variety of ground-engaging wear parts on and from many kinds of earth working equipment including, for example, dozers, loaders, dragline machines, cable shovels, face shovels, hydraulic excavators, dredge cutters, buckets, lips, blades, rippers, shear drums, continuous miners, etc. Examples of such ground-engaging products include points, adapters, intermediate adapters, shrouds, runners, picks, wear plate, etc. Earth working equipment as used herein can at times refer to various excavating or other earthmoving machines, the ground-engaging components of the machines such as buckets, cutter heads, shearer drums, etc., or both the machines and components in combination.

Figure 1:
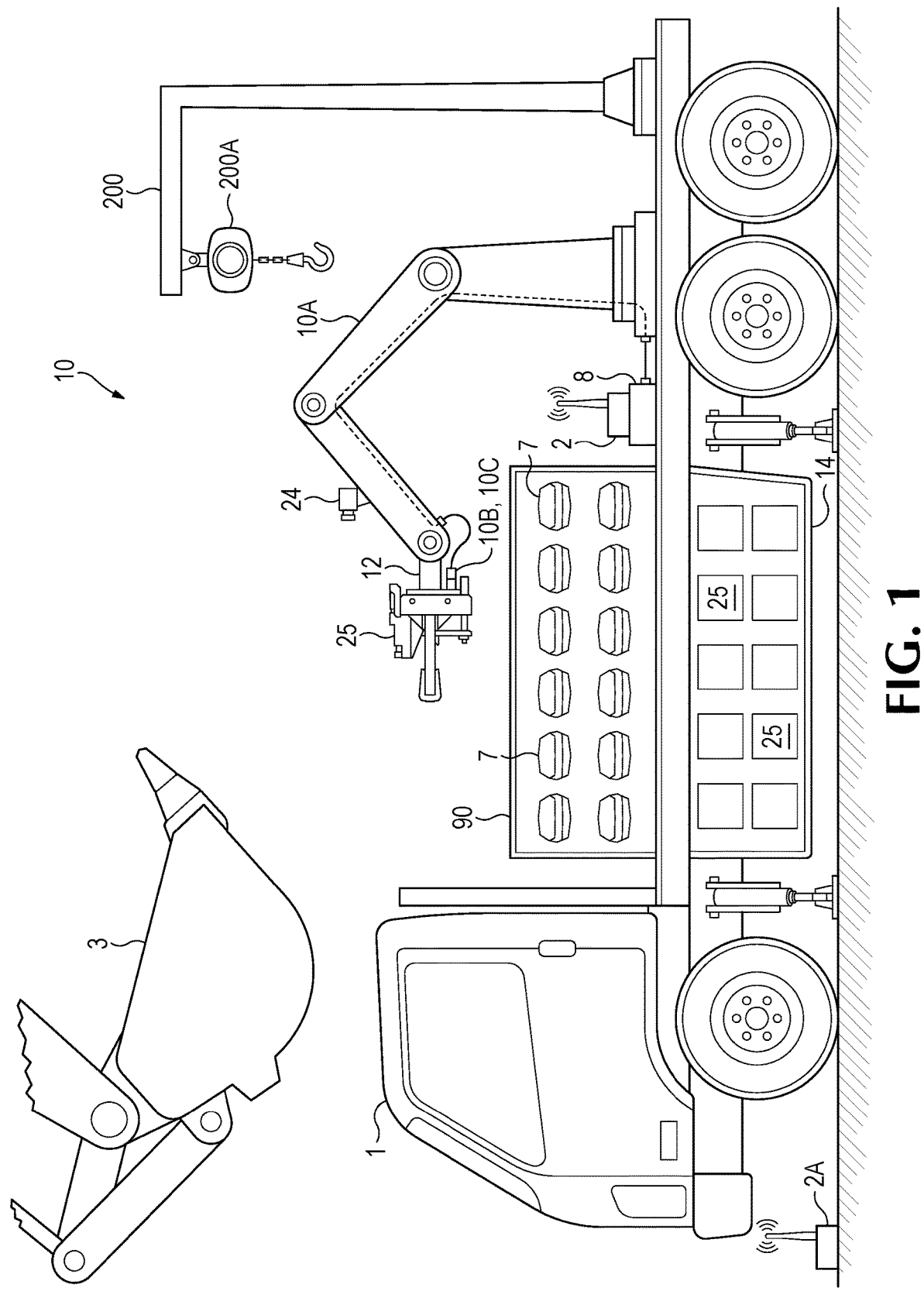
FIG. 1 is a perspective view of a handling system mounted on a truck adjacent a bucket with wear parts.

The handling system 10 can include an articulated arm or manipulator 10A with preferably a universal connector such as an attachment point or socket 12 at the end of the manipulator to support and power a variety of handling tools that connect to the manipulator. The manipulator can be mounted on a truck 1 to provide mobility as shown in FIG. 1, though the manipulator can be connected to other vehicles (e.g., an excavator) or other bases movable or immovable (e.g., trailers or stations). The truck can include a rack 90 for holding worn and new wear parts 7, though other carousels, cartridges, bins or other supporting arrangements could be used for the worn and new wear parts. The manipulator can access a tool library 14 with tools 25 that perform specific functions such as supporting a wear part, turning locks, grasping shrouds, dislodging fines, and/or dislodging wear parts from bases. The truck can include communications 2 for transferring data between a processor 8 and an operator input 2A. Processor 8 can perform functions such as processing data, storing data and controlling machine movement. The truck can optionally include a crane or lift 200 that can pivot about a base to support loads. The lift can optionally include rigging 200A such as a hoist, tackle, chains, tools and links.

The handling system can provide benefits in the removal and/or installation of ground-engaging wear parts, and can also be useful in other handling activities such as moving wear parts to a different location. The handling system can allow the worker to avoid wear part contact and be remote from the wear parts; i.e., the worker can be physically spaced a suitable distance from the wear parts being removed or installed so as to reduce the risk of injury. The handling system can include a plurality of handling tools alternatively interconnected to the manipulator for handling different styles of wear parts, where different styles could mean wear parts that are different size and/or wear parts that have different designs. The handling system can be beneficial in a mine where the wear parts can be heavy, large and/or unwieldy, removal and installation can occur at all times and/or in all weather conditions, and/or the machines can be in a remote, varied and/or unpredictable environment making replacement of wear parts difficult and/or hazardous to complete. The handling system can significantly reduce the number of man-hours required to maintain earth working equipment and reduce machine downtime. The handling system can provide advantages in other earth working operations as well such as at a construction site.

In one example, the earth working equipment includes a bucket 3 that can be used for gathering earthen material during digging. Bucket 3 could be attached to a digging machine or detached. The bucket 3 has a lip 5 that defines the digging edge 6 along the width of the bucket. The digging edge is that portion of the equipment that leads the contact with the ground. Ground-engaging wear parts in the form of teeth and/or shrouds are commonly secured to the digging edge to protect the bucket from premature wear, break up the ground ahead of the digging edge, and/or gather earthen material into the bucket. In the illustrated embodiment, teeth 7 and shrouds 9 such as disclosed in U.S. Pat. No. 9,222,243, which is incorporated herein by reference in its entirety, are attached to the lip. Nevertheless, the handling system can handle other varieties of teeth and other kinds of wear parts (e.g., shrouds).

Figure 2:
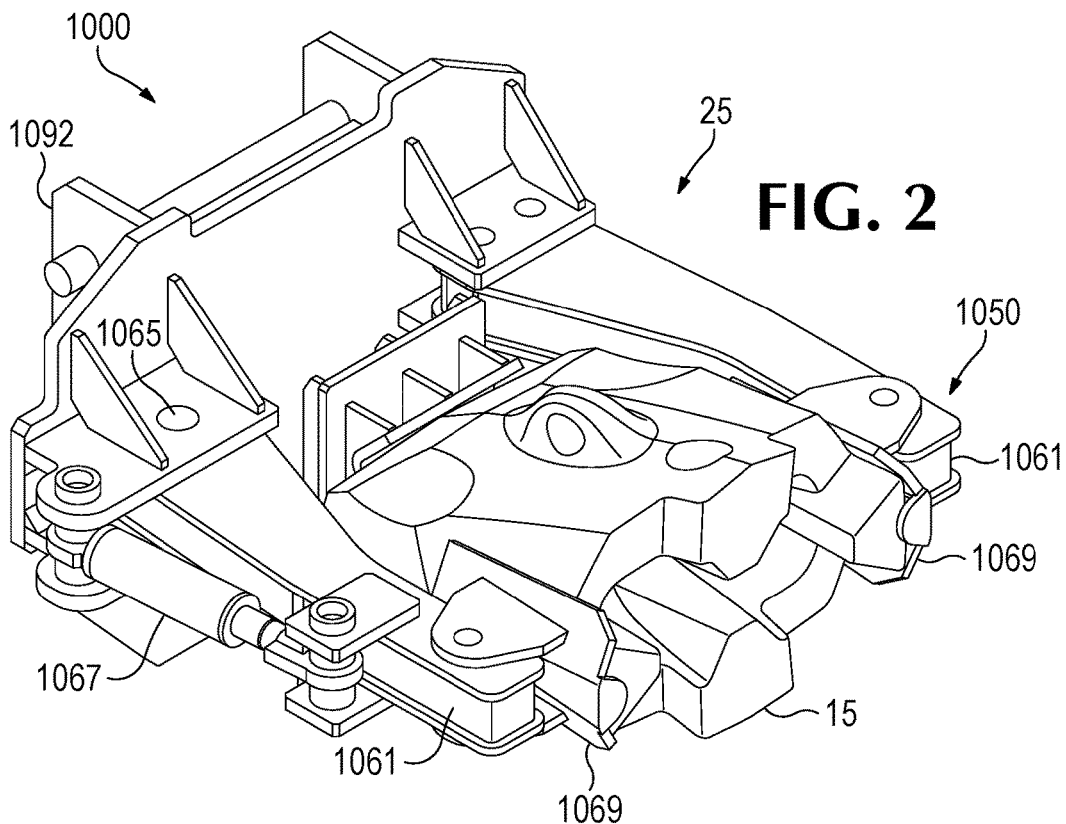
FIG. 2 is a perspective view of a handling tool.
Figure 2A:
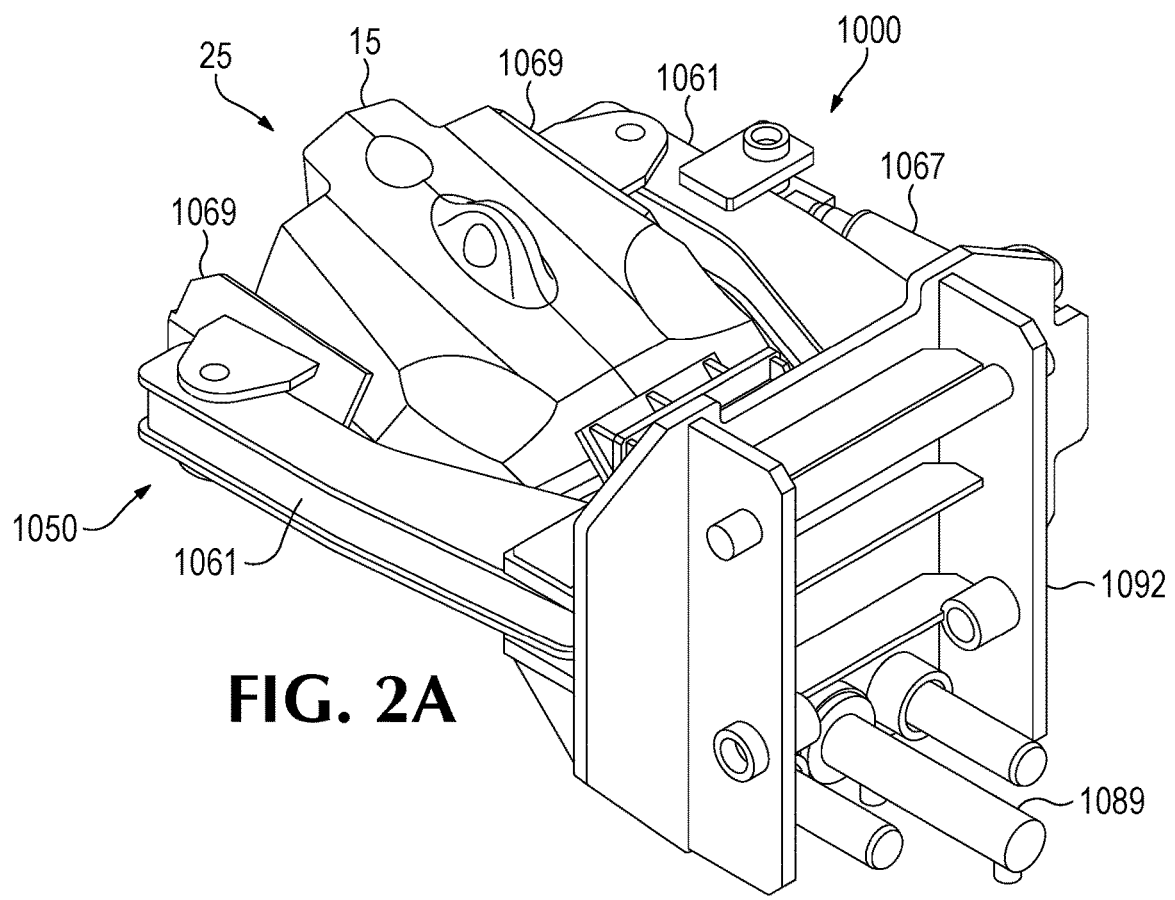
FIG. 2A is a perspective view of the handling tool of FIG. 2.
Figure 2B:
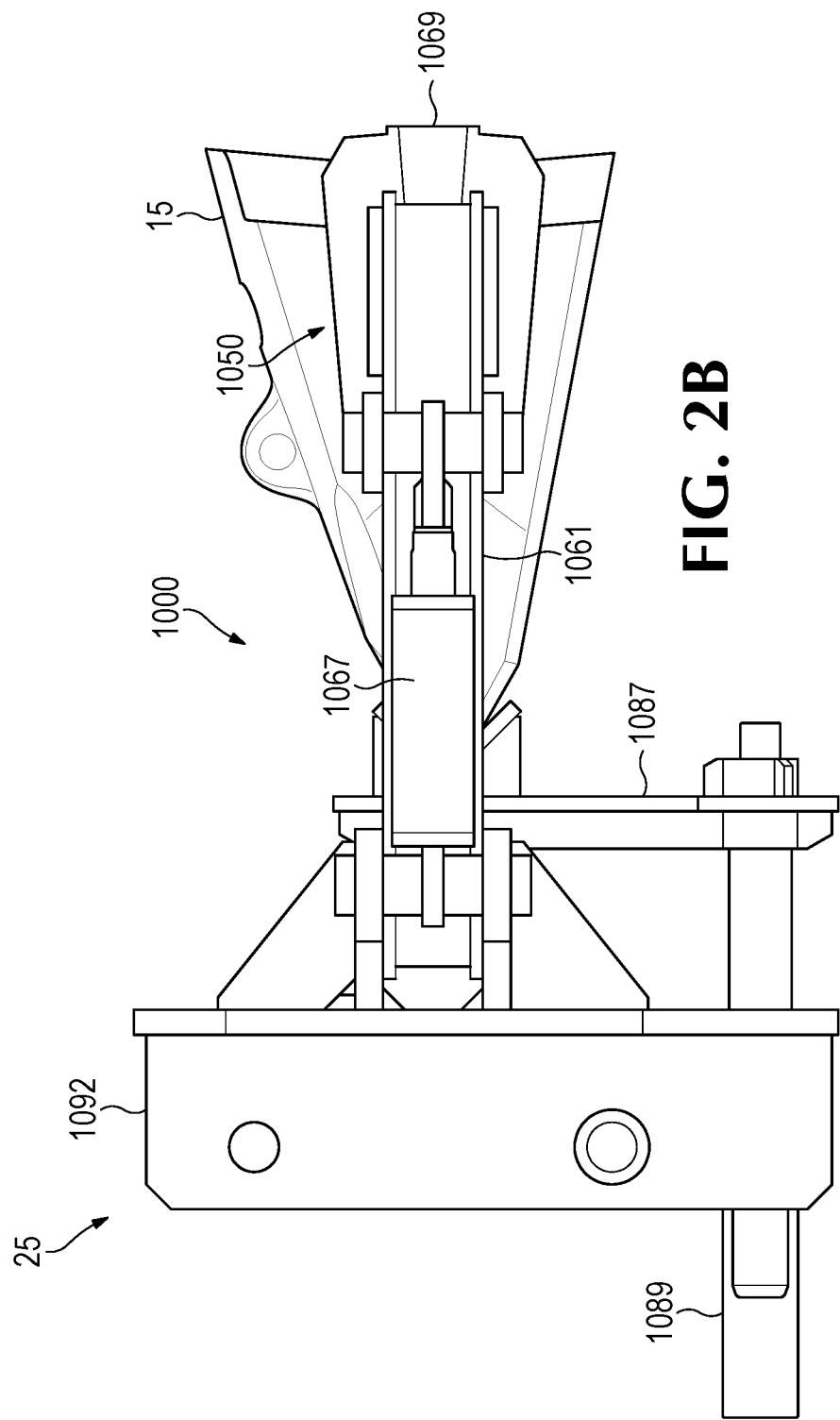
FIG. 2B is a side elevation view of the handling tool of FIG. 2.

Handling tool 25 can include a gripping device 1000 as illustrated in FIG. 2. Gripping device 1000 includes a pair of opposing arms 1061 that move transversely in relation to tip or point 15 to grip and release the tip. Arms 1061 are each pivotally secured to arm supports 1063 to move about pivot pins 1065 in response to actuators 1067, which in this example are hydraulic cylinders. Each arm 1061 includes a gripper 1069 to contact and hold tip 15 on opposing sides. Each gripper 1069 is preferably pivotally attached to the free end of the respective arm 1061. In this embodiment, handling tool 25 is connected to the hydraulic power provided through complementary connectors 10B, 100 at connector 12. Nevertheless, other kinds of actuators could be used such as electric actuators (e.g., rack and pinion, ball screw, etc.), and the source of electric power could be the excavator, batteries or other means. Tooling can include mechanical actuators that are manually operated. In one such example, the manipulator would include an intelligent assist device (IAD), by which the operator could easily manually manipulate the tool head(s) and wear parts for removal and installation from and onto earth working equipment.

Gripping device 1000 includes a support or thrust plate 1087 that complements at least in part the shape of the front portion 19 of the tip. Support 1087 is connected to support actuator 1089 that can move the plate forward and back in relation to chassis or tool body 1092. With the tip held at the rear by arms 1061, the support is moved rearward (or forward) to engage a front portion 19 of the tip. This provides positive retention of the tip between grips 1069 at the back of the tip and the support 1087 supporting the front of the tip 19. Alternatively, the arms could be axially adjustable and the support fixed to the arms or chassis. Other arrangements to hold wear part 15 could be used. In an alternatively embodiment, a support is not used and the arms fully support the wear part.

To remove a worn wear part 15 (in this example a tip), the handling tool 25 is brought near the wear part by the supporting equipment such as truck 1, and the manipulator operated to position the handling tool proximate the worn wear part. With the wear part positioned between arms 1061, the arms are moved toward each other until grippers 1069 contact opposite sides of the tip to securely hold the tip without dropping or slippage. The support is moved, as needed, to engage the front portion of the tooth. After the worn tip 15 is held by the handling tool, the lock is adjusted to a retracted position as described in detail below by a different portion of the tool, another tool, or separately by the operator. The manipulator 10A supporting handling tool 25 is then retracted and the wear part separates from the base it is mounted on. Once the wear part is removed, the manipulator 10A moves handling tool 25 with tip 15 to place the worn tip at a disposal site such as a bin, truck bed, pallet, the ground or other location for disposal of the worn wear part. With the worn tip in rack 90, arms 1061 separate to release the wear part.

To install a new wear part or tip 15 on base or adapter 13, tool 25 is positioned close to the wear part such that arms 1061 are positioned about the new tip. In this embodiment, new tips are stored on a shelf in rack 90 but other arrangements are possible. The arms 1061 are closed to grip opposite sides of a rear portion of the tip, and the support adjusted, as needed, to engage a front portion of the tip. The manipulator 10A pulls the tip from rack and moves it to a position in front of the base where the tip will be installed. The wear part is then moved rearward so the cavity in the wear part receives the base; in this example, the nose of the adapter is received into the tip. The lock can then be moved to secure the wear part to the base by a component of the handling tool, another tool or separately by the operator.

To limit binding or wedging of the bearing surfaces of the cavity on the bearing surfaces of the nose, the tool can include resilient mounting to provide small movements of the wear part in the relation to the support nose. The resilient mounting could be provided by the actuators controlling the position of the tool 25 and/or the retention devices 1050 having a dampening or a float mode. Dampening in the actuators allows the actuators to reduce the force applied to the wear part when a binding situation is detected. Dampening or float in actuators is understood by those skilled in the art and will not be described in detail here. Alternatively, springs could be provided to provide a resilient mounting of the handling tool.

In one embodiment, wear assembly or tooth 7 includes a base adapter 11 welded to lip 5, an intermediate adapter 13 secured to base adapter 11, and a tip or point 15 secured to intermediate adapter 13. Base adapter 11 includes a pair of bifurcated legs 16 to straddle the lip, and a nose 17 to support intermediate adapter 13. Intermediate adapter 13 includes a rearwardly-opening cavity 18 to complement and receive nose 17 of base adapter 11, and a forwardly-extending nose 20 to support tip 15. Tip 15 includes a rearwardly-opening cavity 22 to complement and receive nose 20, and a front end 19 to initiate contact with the ground. Locks 21 secure tip 15 to intermediate adapter 13, and intermediate adapter 13 to base adapter 11. One lock 21 fits in hole 23 in top wall 26 of tip 15 to selectively engage adapter 13, and one lock 21 is received in hole 28 in each sidewall 27 of intermediate adapter 13 to selectively engage base adapter 11. While the locks in wear assembly 7 are all the same, they could be different. This configuration of wear parts is an example for the purpose of illustration. Other constructions are possible. For example, the tip can be installed to a nose of a lip that is integrally cast in the lip without an adapter.

The references to wear parts and bases are based on context. In general, the wear part is the sacrificial part that is secured to or removed from the base. However, the base for the first wear part may also be a wear part secured to a different base. For example, tip 15 is a wear part secured to a base in the form of intermediate adapter 13, intermediate adapter 13 is a wear part secured to a base in the form of base adapter 11, and base adapter 11 is a wear part secured to a base in the form of lip 5. During the life of the bucket, the wear parts 11, 13, 15 are usually replaced a number of times before their respective bases need replacement. Other kinds of wear parts could be transported, manipulated, removed and/or installed by tool 25 including, for example, shrouds 9, runners or other kinds of teeth.

The handling system 10 is preferably controlled remotely by an operator with a remote control 2A. This permits the worker to avoid contacting the wear parts or being in close proximity to the wear parts during a handling operation such as removal and installation. Nevertheless, handling system 10 can provide benefits even if the worker at times contacts or is proximate the wear parts during part or all of a handling operation. As one example, an operator may contact or be in close proximity to the wear parts when manually cleaning out imbedded fines around the lock and/or wear part. As another example, the handling system 10 could be constructed to permit the operator to manually position the tool in proper engagement with the locks. In other embodiments, handling system 10 could be controlled remotely by a person in an office or in the cab of the excavator.

For convenience of discussion only, the earth working equipment having ground-engaging wear parts in need of replacement will be referred to as the "worked-on equipment," and the equipment used to support and position the tool of handling system 10 will be referred to as the "supporting equipment." These are intended to be general terms and include various different earth working equipment and different supporting arrangements.

The manipulator can access handling tools 25 in the tool library 14. The manipulator can be positioned adjacent a tool and connect to the tool at the connector 12. The manipulator can return the tool to an appropriate position, disconnect from the tool and select another tool for performing another function.

The tools can mechanically connect to the connector by any of several methods. For example, the tool and connector can include helical features such as tabs and slots that engage each other by relative rotation of the tool and connector to engage the tabs and slots. The connector can employ a bayonet mount construction. A latch may engage between the connector and tool to prevent inadvertent rotation and separation of the tool and connector. Separation of the tool and connector may include disengagement of the latch prior to relative rotation of the components. Other arrangements are possible.

Alternatively, a handling tool can include a connector 31 such as a mounting bracket with a pair of lateral rods 33 to enable nearly universal attachment to the boom of any of a variety of excavators (e.g., to stick 40 of excavator 39) (FIG. 15); i.e., connector 31 is of a kind commonly used to connect buckets and other tools to the boom of an excavator. Other connectors or features such as threads or mechanical latches without rotation can instead be used to securely join the tool and connector.

Connecting the handling tool to the connector can include supplying power to the tool in the form of hydraulic pressure, electricity and/or air pressure. The tool and connector can include conducting surfaces which make mechanical contact when connected to provide electrical power to the tool. Alternatively, the connector and tool can include hydraulic connections 10B, 10C which engage on the tool connecting to the connector to provide hydraulic power to the tool. Other forms of power can be provided to the tool in addition to or in place of the hydraulic or electric power. Alternatively, the tool can include an internal power source. Connecting the tool to the connector can include making a data connection between the tool and a processor 8 on the truck 1. The operator can use the remote control device to communicate with the processor. Alternatively, the operator can communicate directly with the tool attached to the connector without data crossing the connector interface.

Handling system 10 is relatively compact and stable, and can be readily transported to various work sites. As one example, the handling tool can be supported by a truck as in FIG. 1. The handling tool can be coupled to an excavator 39, which is driven to the worked-on equipment. The handling tool could remain secured to the excavator ready to use when needed, or could be attached and detached as need. As another example, the handling tool could be carried by a vehicle such as a service truck 1 to the worked-on equipment and then coupled to an excavator at the site. As another example, the handling tool could be coupled to a fixed support where the worked-on equipment is taken for service such as a workshop or a worktable. The handling system can be at a fixed location and earth working equipment can be positioned at a defined location adjacent the fixed location to allow maintenance of the wear parts. Other arrangements are also possible.

Handling system 10 can access handling tools 25 having different designs and/or configured to perform specific functions. In one embodiment, FIG. 5 shows a handling tool 150. A tip 15 hangs on a rack 90 with a base in the form or a bracket 90A and 90B retaining the tip by engaging lock hole 23 and the rear edge of the tip. The tool 150 includes one (or more) arm 152 including a bracket 151 secured to the tool body 25A, a harness 153, and a support 154. The harness is a loop that approximates the circumference of the tip 15 when fully worn. Tool 150 can slide over the tip, raise the tip to disengage from the bracket and pull the tip away from the wall. Once removed from the rack, the handling tool can install the tip on the nose of the intermediate adapter. The tool can similarly install a worn tip to the rack by positioning the tip against the rack and lowering the tip so the bracket 90A engages the opening. Alternatively, the worn tip can be deposited in a bin for recycling. Tool 150 has the advantage of not requiring any actuators or moving parts to operate. New and worn wear parts can be mounted on the rack using minimal floor space.

Figure 6:
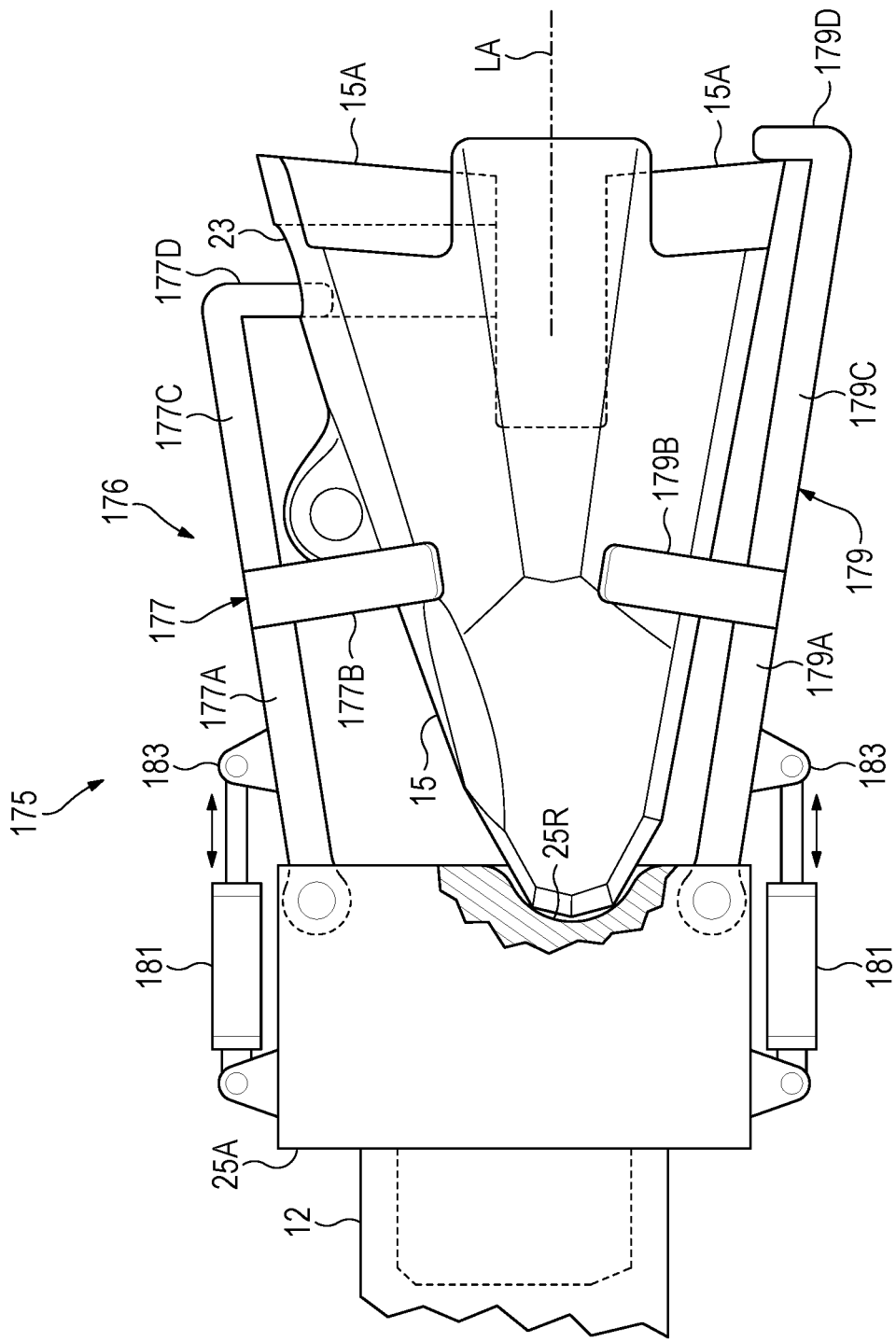
FIG. 6 is a side elevation of a handling tool supporting an excavating tooth.
Figure 7:
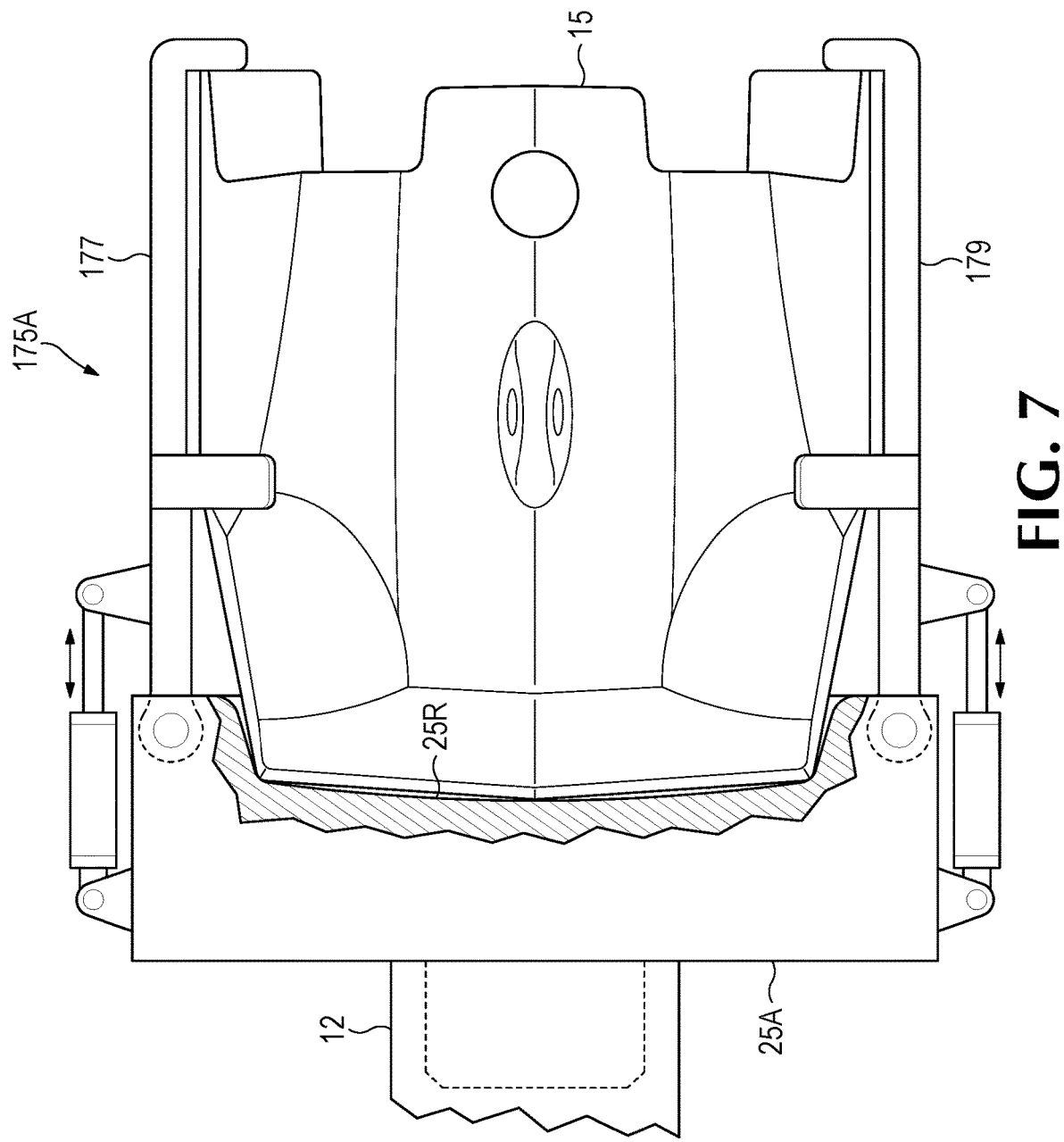
FIG. 7 is a top view of a handling tool supporting an excavating tooth.
Figure 7A:
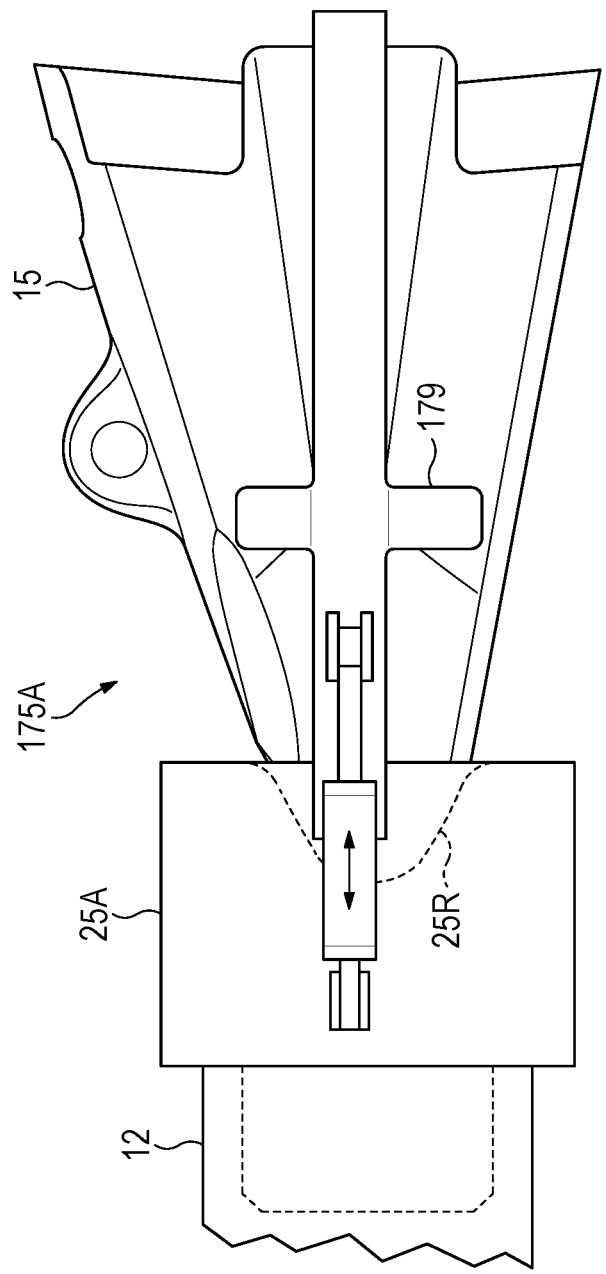
FIG. 7A is a side elevation of the handling tool of FIG. 7.

FIG. 6 shows a handling tool 175 supporting a tip 15. The tool includes a grip assembly 176 with top and bottom arms 177 and 179. Each arm includes a base 177A, 179A extending from the tool body 25A to a bracket 177B, 179B and an extension 177C, 179C extending rearward from the bracket to a bearing surface 177D, 179D at an angle to the extension. The bearing surfaces engage a transverse surface of the tip. The top bearing surface engages lock hole 23 and the bottom bearing surface engages back edge 15A of the wear part extending transverse to a longitudinal axis LA of the tip 15 or wear assembly 7. However, both arms could engage the back edge of the tip. This allows the arms to bear on the wear part longitudinally retaining the wear part front end forward into a support in the form of a recess 25R on the tool body and/or into the brackets. An actuator 181 on each arm bears on a lug 183 to provide transverse movement of the arms to engage and disengage from the wear part. The actuator can be configured to also pull the front of the wear part forward into recess 25R of the tool. Providing additional support for the wear part, FIGS. 7 and 7A show a similar tool 175A with arms 177 and 179 engaging the rear edge 15A on the sides of the wear part rather than gripping the top and bottom of the wear part.

FIGS. 8 and 8A show a tool 200 for supporting a tip 15. The tool includes a grip assembly 201 with a rearward extending rod 202 attached to tool body 25A. Forward arms 204A and 204B and rear arms 206A and 206B extend from the rod downward to pads 204 and 206. One or more actuators 208 control transverse movement of the arms to engage and disengage from the tip 15. Engaging the tip, the grip assembly supports the tip for transport and/or installation.

The manipulator 10A can, when handling tool 25 is secured to the wear part, pull the wear part from the base. Nevertheless, handling tool 25 can include a wear part extractor as shown in FIGS. 9 and 9A. Significant axial force can be required to separate a wear part from the base it is mounted on. An additional tool component 275 can be provided as part of the handling tool or used as a discrete tool. In one example, tool component 275 is engaged with a tip 15 mounted on an adapter 13. The tool component includes a rearward extending arm 277 terminating in a head 279. The head includes an actuator 281, cam arm 283 and cam 285. The cam is inserted into the gap defined by the rear edge 15A of the wear part and a front edge 13A of the adapter. The cam can take on many different shapes, but generally has a length and a narrower width. The width is less than the gap dimension and the length is greater than the gap dimension Dg. The tool component rotates the cam in the gap when actuator 281 extends to push on arm 283. The arm rotates the cam. As the cam bears on the surfaces an axial force is generated which urges the wear part off the base. The initial movement of the wear part in relation to the adapter fractures the accumulated fines and the force required to extract the wear part drops significantly. The cam can be driven in any of several different ways. A torque drive such as hydraulic, electric, chain drive or a screw drive can be used. Other prying configurations can be used that perform a similar function. A wear part extractor could alternatively be operated by the operator independently of tool 25.

FIGS. 10, 10A and 10B show another embodiment of an extractor device tool component. Tool 300 applies axial force to the wear part and the adapter to separate them. The extractor device is shown with two arms extending rearward from the tool body and terminating in a bearing portion 302A and 304A extending inward from the arms. The bearing surfaces engage the gap between wear parts at 13A and 15A. Arm 302 is attached to actuator 306 which acts to retract the arm. Arm 304 is attached to actuator 308 which acts to extend the arm. Operating the actuators causes arm 302 to pull on tip 15 and 304 to push on adapter 13 urging them to separate. With the wear part separated from the adapter, the wear part can be supported between the support in the form of recess 25R in the tool body and the arms 302. The arms 302 can be connected to actuators 310 by brackets 308A to pivot the arms around pivots 312 and 314. Pivoting the arms separates the bearing surfaces from the wear part so the wear part can be separated from the tool. Alternatively, the extractor can dislodge the wear part and a second handling tool can be used to remove the wear part from the base.

Alternatively, the extractor device can grip the wear part at a different location than that shown. The tool can have arms on one side or can have a similar configuration of arms on two sides. The tool arm 304 could bear on the lip or another portion rearward of the wear part to apply axial force between the lip and the leverage point of the wear part. The extractor could apply force simultaneously to opposite sides of the wear part and/or could apply force on alternating sides. The extractor could be used in conjunction with an oscillator to apply axial force and transverse oscillator force simultaneously. An oscillating force could be effective at fracturing accretions which limit separation of the wear part from the base.

A crane 200, as a manipulator, may optionally be used in conjunction with the tools, particularly with the extracting devices. The crane can include rigging 200A such as chains, eyes and/or hooks that connect to the eyes of lift members installed in the lock opening. The crane can be controlled from the same remote interface accessed by the operator to handle the wear part when separate from the base. Supporting the wear part with a crane allows the tools to be sized and configured to perform the separation and attachment functions without supporting the wear part.

Figure 17:
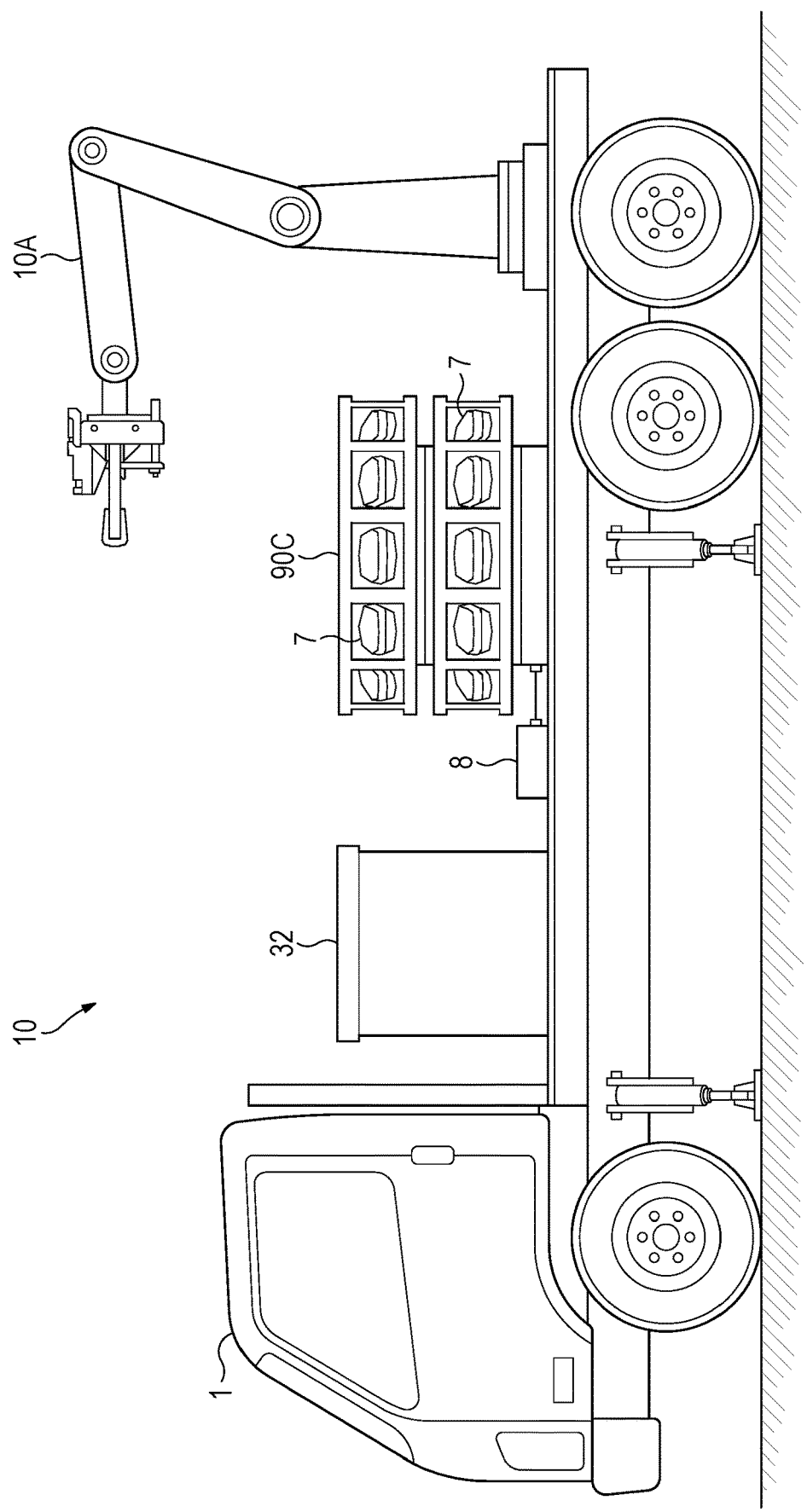
FIG. 17 is a perspective view of a handling system mounted on a truck with a carousel rack for wear parts.

In another embodiment, the crane or manipulator can be an intelligent assist device (IAD) for supporting the wear part; the IAD manipulator could as shown in FIG. 17. An IAD is a computer controlled servo driven tool that enables an operator to lift, move and position payloads with minimal applied force. The IAD can act as a force multiplier allowing a heavy load to be handled by an operator with a minimum effort and fine control. An IAD typically controls loads to multiply an operator applied force in three dimensions. IAD can be incorporated into an articulated arm. Tool balancers are used to control lifting of loads and multiply an operator applied force in the vertical direction. Such a handling system can include a manipulator incorporating IAD functionality, and a handling tool with arms to grip and release the wear part. The handling tool could grip the wear parts as discussed above in the example handling tools or in other ways. In another embodiment, a handling system for wear parts can include a crane, a rigging system with a tool balancer as a vertical operator force multiplier and a handling tool with arms to grip and release a rear portion of the wear part.

Figure 11:
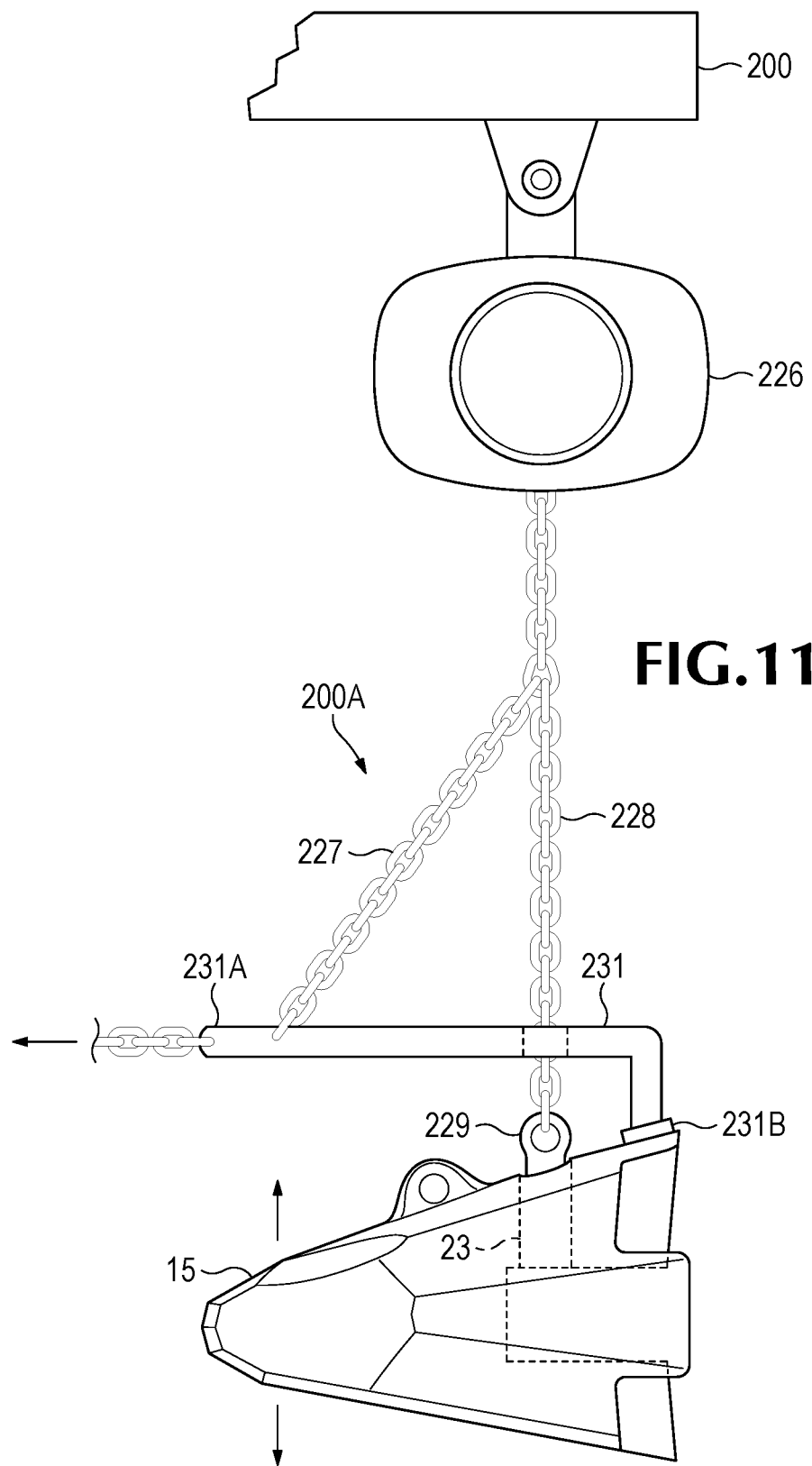
FIG. 11 is a side view of a rigging tool used with a crane supporting an excavating tooth.

A rigging tool as shown in FIG. 11 can limit rotation of the worn tip. Rigging 200A includes a hoist 226, front chain 227, rear chain 228 and eye 229 to engage lock hole 23. Rigging tool 231 engages the rigging between the rear chain and the eye. The front portion 231A is supported by front chain 227. The rear portion 231B bears down on the tooth adjacent rear edge 15A to limit rotation of the wear part when separated from a base. The rigging tool can include a rearward extension (not shown) and an additional chain rearward of the rear chain to provide additional support and balance. The rigging 200A of FIG. 11 can incorporate tool balancer or IAD functionality.

Figure 11A:
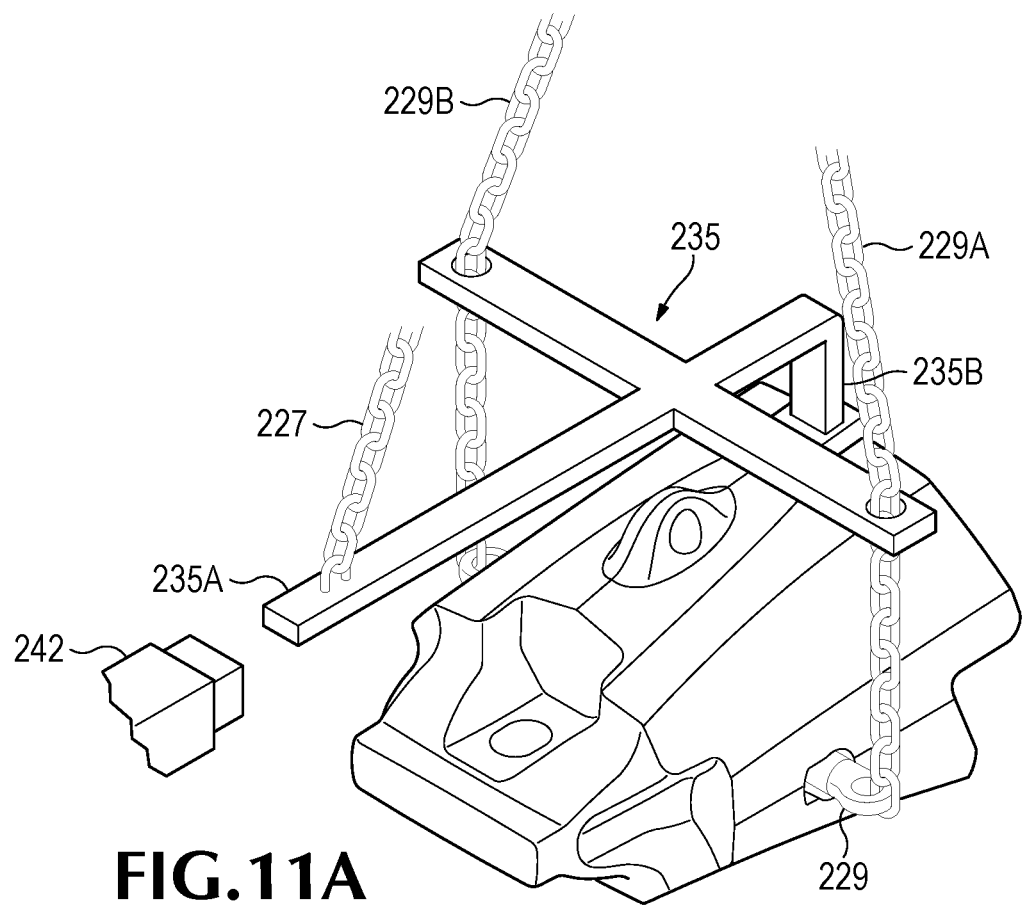
FIG. 11A is a perspective view of a rigging tool used with a crane supporting an adapter.

FIG. 11A shows a rigging tool 235 for supporting adapters. In this embodiment lifting eyes are installed in lock holes on each side of the adapter. Rigging includes rear chains 229A and 229B attached to the eyes. Handling tool 235 is shown with a cross member that engages the rear chains on each side. The front portion 235A of the rigging tool is supported by front chain 227 and the rear portion 235B bears down on the rear of the adapter to limit rotation of the adapter.

The rigging tool can be used to manipulate and handle the wear part. Handling system 10 can include a tool 242 to engage the front portion 231A or 235A of the rigging tool to move and orient the wear part. Tool 242 can positively engage the rigging tool without supporting the wear part to steer the wear part. The rigging tool bears on the wear part when installing or removing the wear part from the nose of a support. A vibrator can be applied to the wear part while pulling on the handling tool to dislodge the wear part from a base.

Figure 11B:
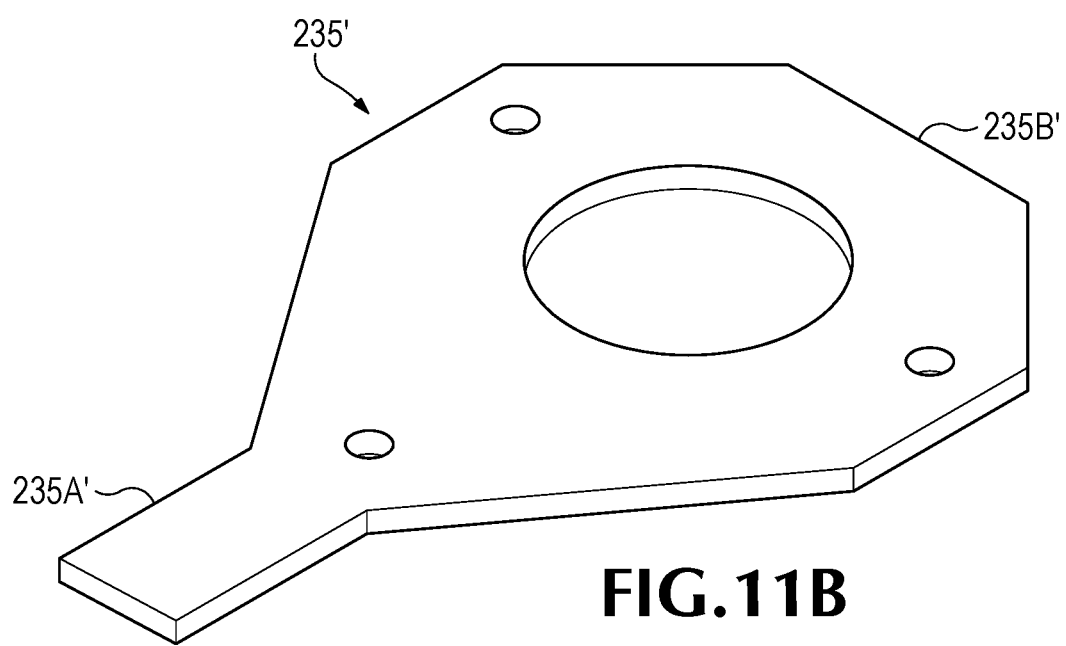
FIG. 11B is a perspective view of an alternative rigging tool for supporting an adapter.
Figure 12:
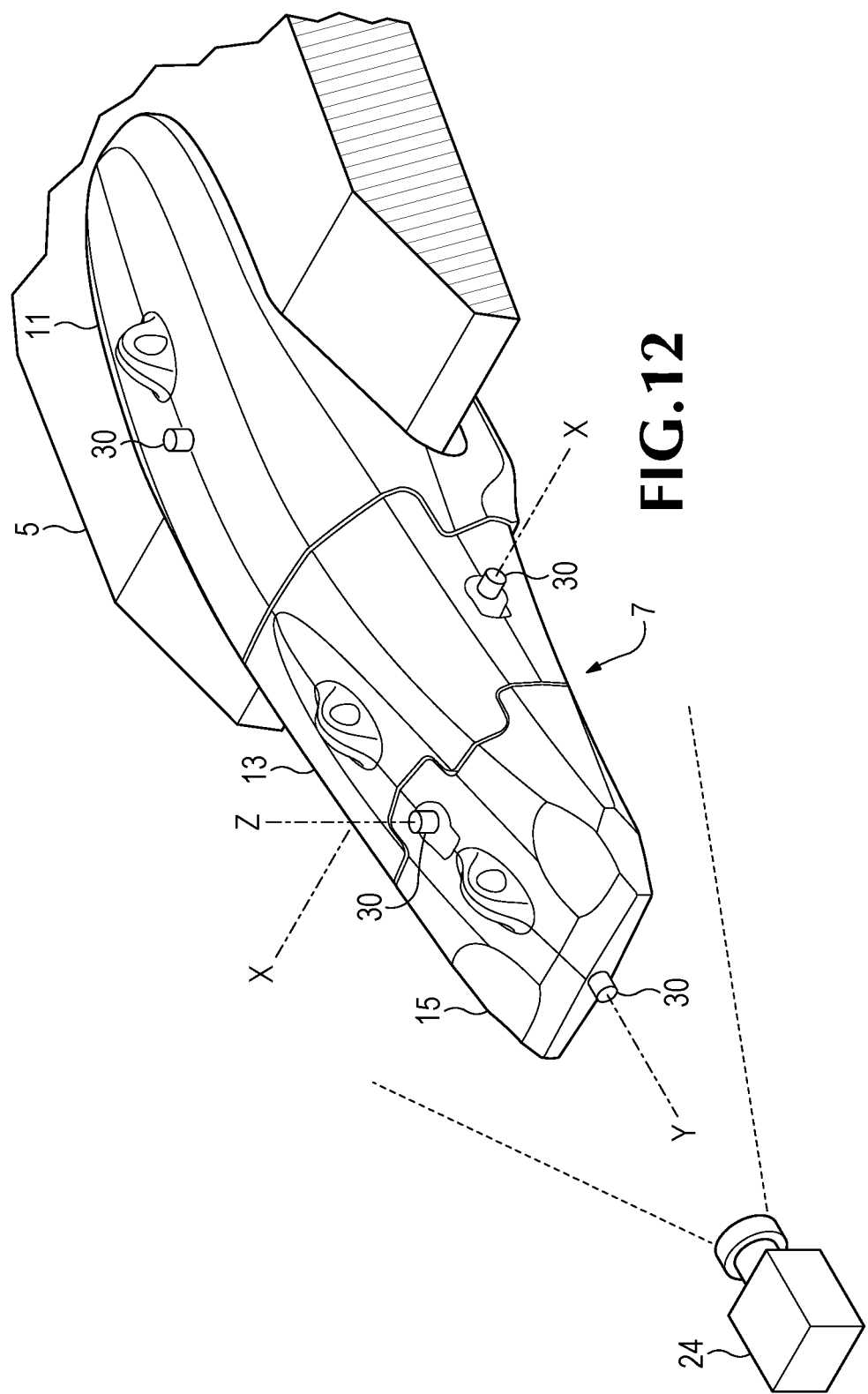
FIG. 12 is a perspective view of a wear assembly with datum points.

An alternative configuration for a rigging tool similar to tool 235' with front portion 235A' and rear portion 235B' is shown in FIG. 11B. Alternatively, the rigging tool can be a cartridge to house the wear part. The cartridge can have top, bottom and side walls with the wear part retained inside. The rigging can connect to the cartridge to support the wear part.

The handling system can include a data gathering device for defining a coordinate system such as a digital camera 24 or other image capture device. A camera can acquire images of the tool, the worked on equipment and/or the support equipment. The images acquired by the camera can be used to orient the tool and the support equipment with the worked on equipment. The worked on equipment can include one or more datum points 30 that allow the support equipment to establish a coordinate system for the wear part to be replaced with an orientation and location for the wear part in relation to the support equipment and the connector. The datum point can be a feature differentiable in the images such as a cast feature of the wear part or a component of the wear part such as a lock. An image processing system can be used to locate the datum in images and provide coordinates for the datum in the images. Alternatively, the datum point coordinates can be determined using a transmitter and a radio receiver, an acoustic transmitter and acoustic receiver, or other equipment. Alternatively, the handling system can receive data at the processor from a data gathering system associated with the earth working equipment and/or by sensors provided in the wear parts mounted on the earth working equipment.

The camera 24 can be connected to a processor that accesses image processing software. The software can process images from the camera and differentiate features in the image. For example, the software can be programmed to differentiate one or more datum points in an image and determine their location in the image. The software can be registered to a coordinate system and the location of tools, bins and other feature coordinates can be registered with the software. A datum is a reference point for locating known features of wear part. The datum can be registered to the known features in the image processing software to determine an orientation and coordinates of the wear part.

A feature can be attached to the worked on equipment to act as a datum point. The datum point could be one or more adhesive stickers with a distinct pattern that is applied to the wear part by an operator. The datum point can be a reflector or cube reflector (retroflector) positioned on the wear part or the worked on equipment at a known position.

In one embodiment, a datum is a cube reflector as shown in FIG. 13. First and second retroflector 30A and 30B are mounted on each end of a retroreflector base 30C. The base 30C can include magnets to secure the base 30C to the wear part 15. The base 30C can be placed on the top of the wear part to the rear of the lock opening. The cube reflectors or retroflectors return an image to the light source. Any light source is reflected directly back to the light source. Cube reflectors are well known to those skilled in the art and will not be described in further detail. The distance X between the retroflectors mounted on the base is a known value.

Figure 13A:
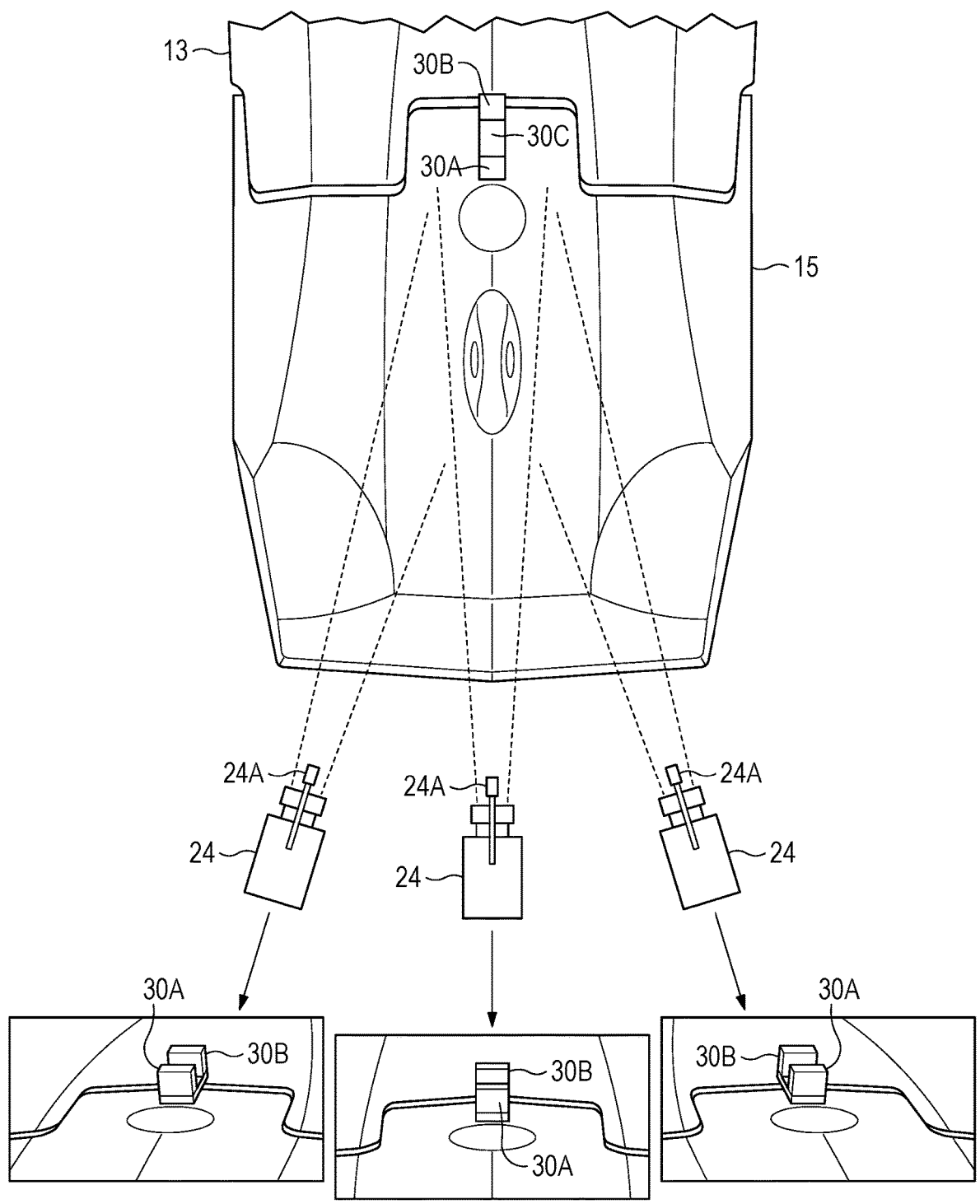
FIG. 13A is a perspective view of the wear assembly of FIG. 13 and camera images from different perspectives.

A light source 24A such as an LED can be positioned in front of the lens of the camera as shown in FIG. 13A. When the camera is pointed toward the retroflectors on the wear part, the camera can capture an image that includes the light from the retroflectors. When the camera is in line with the two retroflectors, one light image is directly behind the other as shown in FIG. 13A. Moving the camera from in front of the retroflectors to the left or right, the light images will separate horizontally. Moving the camera from in front of the retroflectors to a position above the retroflectors, the light images will separate vertically. With the distance between the retroflectors known and the distance the camera moves between images known, trigonometry can be used to establish the coordinates and orientation of the retroflectors and the worked on equipment in relation to the camera and handling system. A first coordinate system can be programmed that includes coordinates and orientation of features of the handling system such as bins and racks in relation to the arm and/or camera. A second coordinate system can be determined for the coordinates and orientation of the wear part and/or worked on equipment.

This is one example of a position determining system. Other position determining systems can be used. Systems for establishing coordinate systems of a target are well known to those skilled in the art. Orienting systems can use a wi-fi positioning system, radio frequency ID (RFID), cell technology ZigBee, Ultra-Wide Band (UWB), Bluetooth, Inertial Navigation System (INS), Inertial Measurement Unit (IMU) and multisensor-based systems. Infrared, ultrasonic, geomagnetic, assisted-GPS, LIDAR, RADAR and/or universal software radio peripheral (USRP) etc. among many others can be used. Any of the positioning systems can be used to automate (fully or partially) the operations of the handling systems. The positioning system can be used in conjunction with a measuring/monitoring system of wear parts. For example a camera that collects images of a wear part to determine the extent of erosion of the part can also identify datum points of the wear part. Alternatively, a system in the wear part that records operational parameters of the wear part and transmits the data to a receiver can be used to orient the handling system in relation to the part and define a coordinate system.

Alternatively, the operator can position the tool manually to a set position in relation to the wear part. This start position can provide a datum and axes for operation of the tools. For example, the operator may position the torque interface of the tool in the recess of the lock. Initializing the system from this position, the tool can reference all movements to this position to appropriately position all tools for their function in relation to the wear part for automatic or semi-automatic operation.

Handling system 10 can be used to remove and install tips 15 and intermediate adapters 13. However, the handling system could, e.g., be structured to remove and/or install other kinds, sizes and combinations of wear parts. As examples only, the handling system could be constructed to handle any combination of tips 15, intermediate adapters 13, base adapters 11, shrouds 9, components of other kinds of teeth and/or shrouds, wing shrouds, wear caps, runners and/or other kinds of ground-engaging wear part secured to a base. In one embodiment, the manipulator 10A can engage any number of tools 25 to suit the kind and size of a particular wear part as well as the operation to be performed. The various tools 25 can be supported by the truck (or other support) for selective engagement by the manipulator 10A for use as needed.

Figure 15:
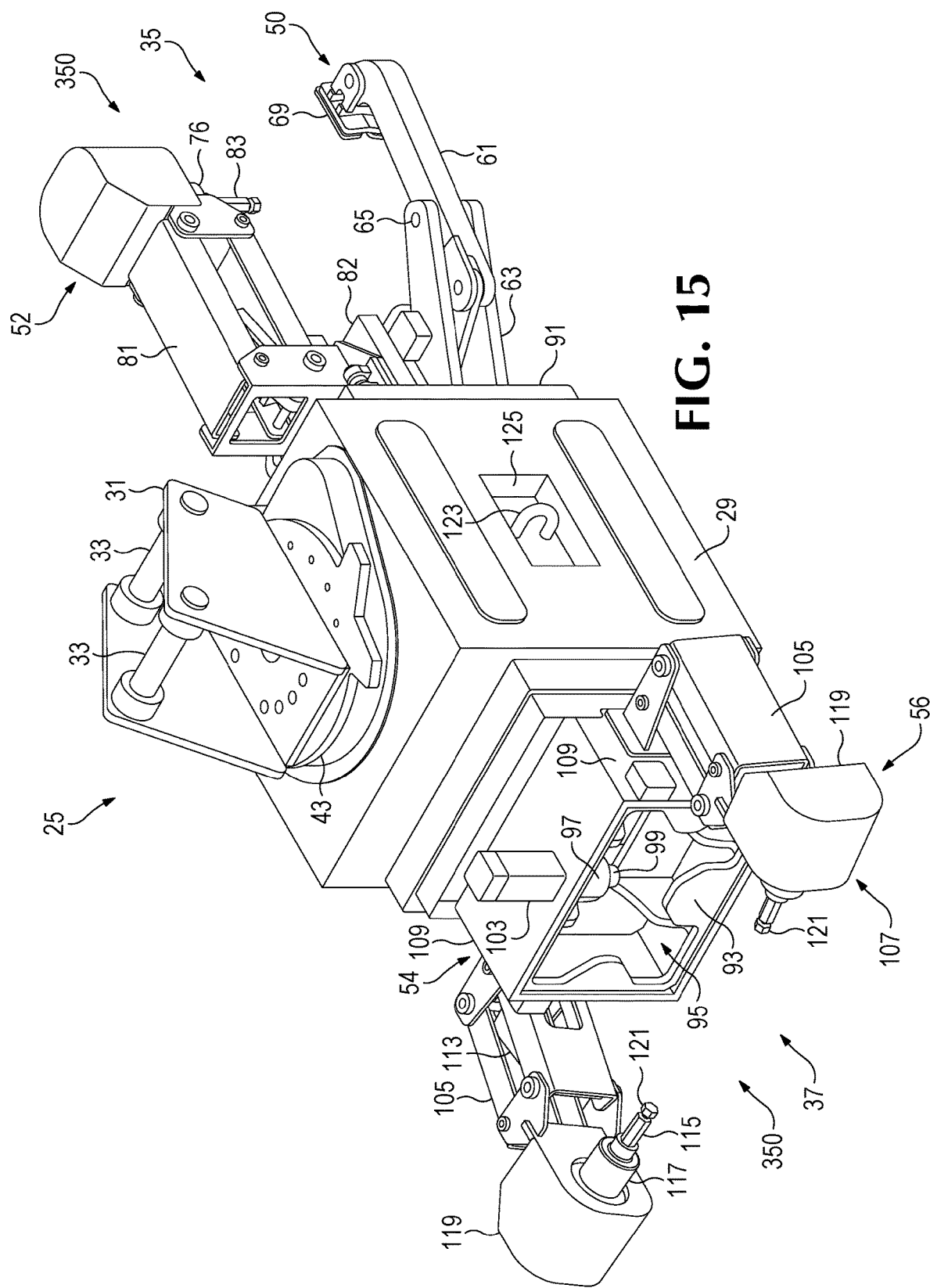
FIG. 15 is a perspective view of a handling tool.
Figure 16:
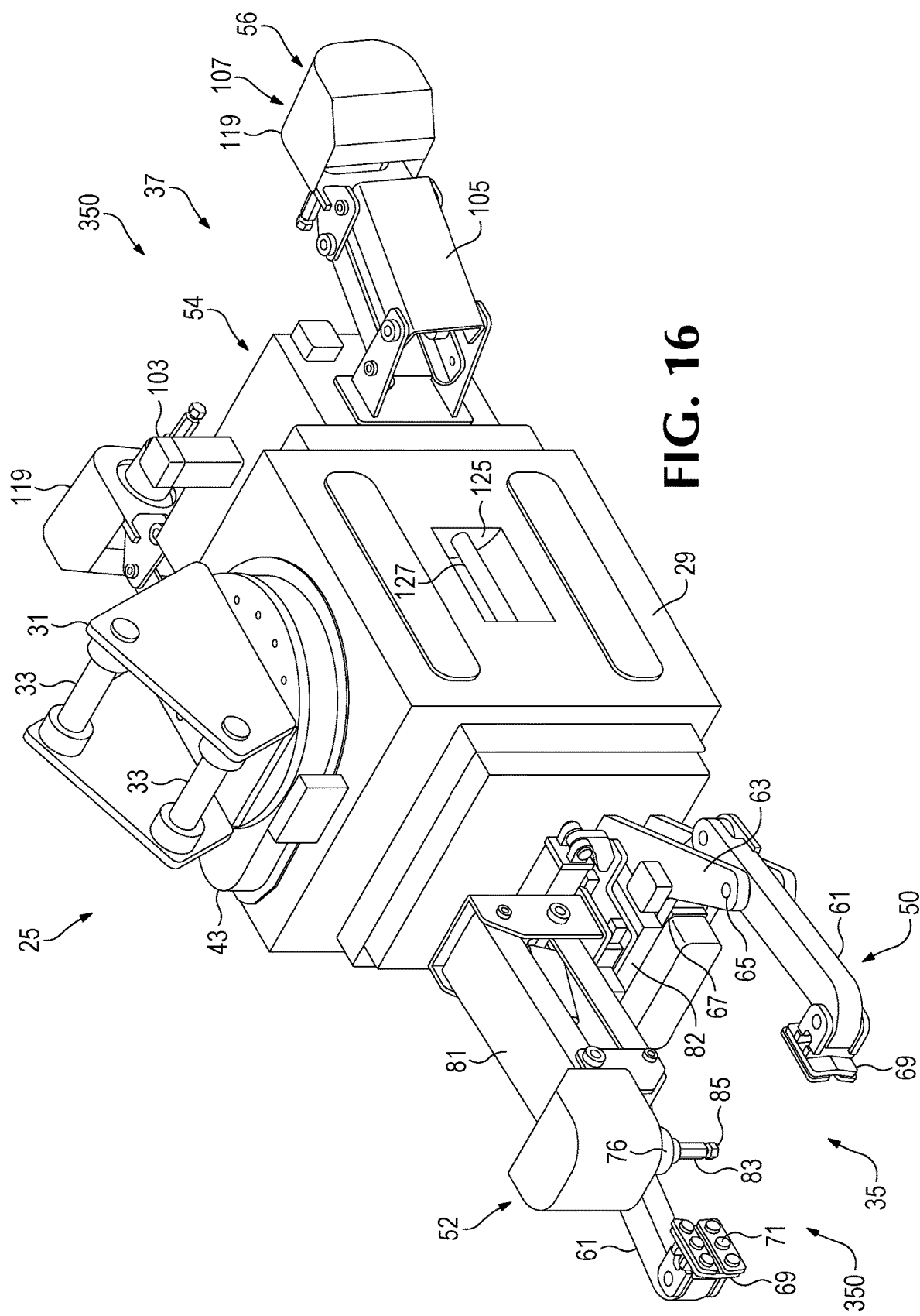
FIG. 16 is a perspective view of the handling tool of FIG. 15 rotated 180°.

In another embodiment, handling tool 25 includes two discrete operating tool heads for handling different kinds of ground-engaging wear parts as opposed to having two discrete tools to handle each of the two wear parts. As shown in FIGS. 15 and 16, handling tool 25 includes a first tool head 35 to handle tips 15 and a second tool head 37 to handle intermediate adapters 13. The tool heads, though, could be provided to account for other products or differences. As examples only, different tool heads could be provided to handle (i) different sizes of the same wear part, (ii) different kinds of teeth, and/or (iii) different kinds of wear parts such as shrouds and points. These tool heads could also be alternatively structured as discrete tools secured to connector 12 of manipulator 10A.

In the illustrated embodiment, the tool heads 35, 37 extend from opposite sides of a chassis contained within housing 29. A turntable 43 is preferably provided between connector 31 and the chassis to enable easy turning of tool 25 depending on the needed operation. Nevertheless, turning of handling tool 25 could be accomplished by other means such as manipulation by the supporting equipment, or being detached and reversibly attached to the supporting equipment. In other embodiments, the tool heads could be arranged in other ways. For example, the tool heads could extend at 90° relative to each other (or at other orientations) rather than the 180° shown in the drawings. The handling tool could support more than two tool heads by, e.g., orienting them at smaller angles to each other. For example, a 90° spacing could accommodate four tool heads with one extending from each side of housing 29. If necessary, the tool heads' components could be vertically spaced to avoid interference with adjacent tool heads. Further, multiple tool heads could be provided on the same side by, e.g., adjusting different tool components or interchanging tool components to present the components needed to engage the desired wear part when needed. For example, different supports (as discussed further below) for receiving and holding different sized noses could be a part of the same tool heads with the different supports being oriented in a position for use as needed. As another example, such a support could be adjustable to hold different sizes or kinds of noses. A rotating tool carriage could also be provided that may incorporate other components such as a masonry impact drill, needle scaler, etc. along with the hex bit for lock clean-out and removal. Other fine removal components such as disclosed in US Patent Application 20150107075 which is incorporated herein by reference in its entirety, could also be used. Other components for other operations could be provided as well.

The tool heads could have a wide variety of constructions depending on the particular wear part to be handled, the locks used to retain the wear part in place, and the earth working equipment the wear parts are used on. The tool heads can include a retention device and a lock operating device. Alternatively, the locks can be actuated independently by the operator. In this embodiment, tool head 35 includes a retention device 50 to securely hold tip 15, and a lock operating device 52 to move lock 21 between its hold and release positions. Similarly, tool head 37 includes a retention device 54 to securely hold adapter 13, and a pair of lock operating devices 56 to adjust locks 21 is the sidewalls 27 of adapter 13.

In one embodiment, retention device 50 includes a pair of opposing arms 61 that move toward and away from tip 15 to grip and release the tip. Arms 61 are each pivotally secured to arm supports 63 to move about pivot pins 65 by actuators 67, which in this example are hydraulic cylinders. In this embodiment, handling tool 25 is connected to the hydraulic power provided by excavator 39. Nevertheless, other kinds of actuators could be used such as electric actuators (e.g., rack and pinion, ball screw, etc.). In this alternative example, the source of electric power could be the excavator, batteries or other means. Each arm 61 includes a gripper 69 to contact and hold tip 15 on opposite sides. Each gripper 69 is preferably pivotally attached to the free end of the respective arm 61. The grippers 69 also preferably include multiple friction members 71 (e.g., coarse grip tool steel pads, carbide, etc.) to more securely hold tip 15 from slipping.

Lock operating device 52 includes a shank 83 to engage threaded pin 75. In this embodiment, shank 83 has a free end 85 with a hex configuration to be received in a hex recess 87 formed in the head 89 of pin 75. The opposite end of shank 83 is coupled to a motor 76 or other device providing torque to rotate shank 83 in either direction to adjust lock 21 between its hold and release positions. The motor is hydraulically driven but could have another construction (e.g., an electric motor). The shank 83 and motor 76 are supported by a central arm 81 with a parallel linkage to maintain the orientation of shank 83 during adjustment of the arm. The linkage is moved by a hydraulic cylinder (or other actuator) between an upward release position and a downward engaged position. Arm 81 is supported on an adjustable mounting table 82 capable of moving arm 81 right-left and in-out relative to the position of tip 15 held by arms 61 in order to fine tune the position of shank 83 for engagement in recess 87. The mounting table 82 includes rails, guides, etc., for directing the desired motion, and racks and pinion, chains and sprocket, etc. driven hydraulic (or other) motors. This kind of lock operating device or another, could be included in tool 25 shown in FIG. 2.

Attaching the wear part to the base includes orienting the wear part to bring it in to axial alignment with the base. Small misalignments of the wear part and base can result in binding of the bearing surfaces before the wear part is fully seated. A tool for handling the wear part will include grips or contact points for moving and aligning the wear part. Tool 25 can maintain a resilient connection with the wear part that allows the wear part to deflect in response to contact of the wear part with the base. Where the bearing surface normal forces would previously increase as the wear part is pushed onto the base until the wear part binds on the base, here the resilient mounting of the wear part provides compliance and allows the wear part to deflect as the normal forces increase. A small deflection can overcome binding allowing the wear part to seat on the base. The resilient connection can use spring mounting or elastomer mounting to allow small amounts of wear part deflection. A float feature could also be provided in, e.g., the hydraulic drive of the manipulator 10A. Vibration of the tool during mounting can also promote deflection of the wear part and complete mounting on the base.

Arms 61, 81 are mounted on a tool head framework 91, can be resiliently coupled to a central chassis (within housing 29). The chassis supports the tool heads 35, 37 and connects the tool heads to turntable 43 and, in turn, to connector 31. In one embodiment, tool head 35 is attached to chassis 92 by a ball joint to provide some freedom of motion for the handling of the wear parts. A plurality of springs 94 along the bottom of the tool head provide resilient support for the tool head, though other resilient connections could be used. The resilient connection through ball joint and springs 94 gives tool head 35 flexibility when gripping tip 15 to ease the handling process as the chassis is preferably fixed to excavator 39 through connector 31. The resilient connection also gives some buffer and freedom of motion for the movements of boom 40 of excavator 39 relative to the worked-on equipment. The connection of tool head 35 to the chassis could, however, be rigid. The manipulator could be sufficiently controlled (e.g., with a robot manipulator) such that a rigid connection can be readily used, or a resilient connection can be provided elsewhere in the assembly. The connection of tool head 35 to chassis 92 could also be adjustable so that it can transition between a flexible (e.g., for operation) or locked as a rigid connection (e.g., for transportation). In one embodiment, hydraulic cylinders push against tool head 35 to tighten the ball joint assembly and prevent freedom of motion.

Figure 14:
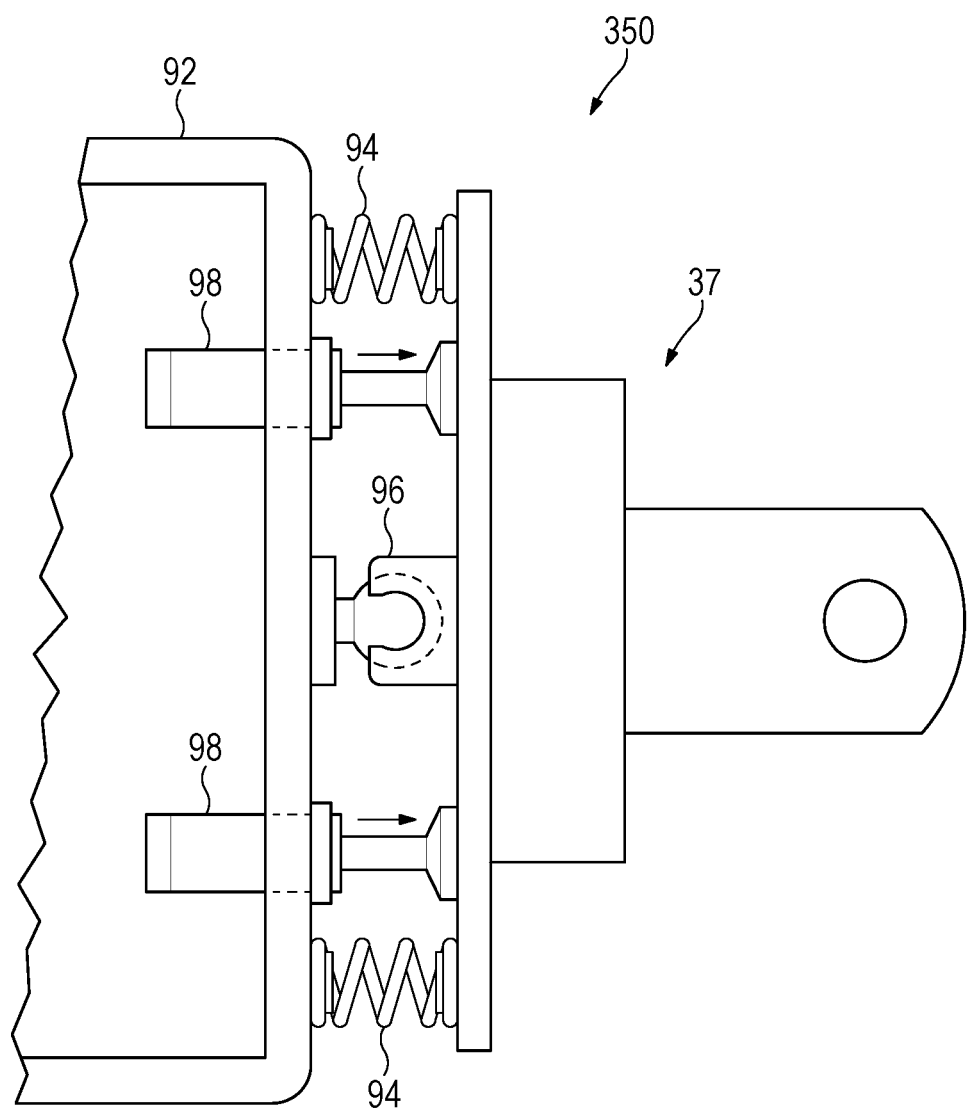
FIG. 14 is a perspective view of tool body with resilient support.

Tool head 37 is shown in FIG. 14 attached to the chassis by a ball joint 93 and a plurality of springs 94, which in this embodiment is the same arrangement as for tool head 35. Other connections, resilient and otherwise, could be used. As with tool head 35, the resilient connection gives tool head 37 flexibility when receiving wear part 13 in support 93. The resilient connection also gives some buffer and freedom of motion relative to the movements of boom 40 of excavator 39 in manipulating handling tool 25. As with the connection of tool head 35, tool head 37 can have a rigid connection or an adjustable connection that can be resilient or rigid. In one embodiment, hydraulic cylinders 98 mounted to the chassis 92 expand to push against tool head 37 to tighten the ball joint 96 and limit the freedom of motion provided by the ball joint 96 and springs 94. Alternatively, the actuators can be dampened to limit the normal force between bearing surfaces as the tooth is mounted to the nose.

Handling tools 25 to connect to the arm can include a waterjet to clear fines from collected areas including the lock recess and interfaces between adjacent parts. The fine particles in a mining operation can collect and accrete to form hard compactions that limit access. A waterjet can break up these compactions to allow tools to access critical areas.

To remove a worn tip 15, handling tool 25 is brought near the tip by the supporting equipment. If bucket 3 is attached to a digging machine, the machine may orient the bucket for easier access by handling tool 25. With the tip positioned between arms 61, the arms are moved toward each other until grippers 69 contact opposite sides of the tip to securely hold the tip without dropping or slippage. Arm 81 can be adjusted forward/backward and/or right/left by mounting table 82 as needed to align shank 83 with recess 87. The shank 83 is, then, lowered for insertion into recess 87 in threaded pin 75 of lock 21, and rotated to adjust the pin outward to the release position where the pin is free of recess 77 in nose 20. Tip 15 is pulled from nose 20 by operation of boom 40. In some circumstances, the worker may ease removal of the wear part by cleaning out impacted fines. The fines can be manually removed by a worker or removed by means provided on tool 25 such as disclosed in US Patent Application 2015010705, which is incorporated herein in its entirety. Fines and accretions binding the wear part in place can be separated by an oscillator or an impactor described below. Once the tip is removed, the excavator 39 moves handling tool 25 with tip 15 to place the worn tip in a bin 91 (FIG. 14) or other disposal site such as a truck bed, pallet, the ground or other location for disposal of the worn wear part. With the worn tip in bin 91, the shank 83 is withdrawn from lock 21 and arms 61 separated to release the wear part. Tip 15 is pulled from nose 20.

To install a new tip 15 on adapter 13, tool 25 is positioned close to the wear part such that arms 61 are positioned about the new tip. In this embodiment, new tips are stored on a shelf in rack 90. However, other arrangements could be used to hold the new tips. For example, the new tips could be supported a number of different customized supports or by a common support such as a pallet, service vehicle, the ground, etc. The arms 61 are closed to grip opposite sides of the tip. Once the tip is held by arms 61, preferably, arm 81 is adjusted and shank 83 is inserted into recess 87 in threaded pin 75. While locks 21 in new tips are ordinarily provided in the release position, engagement of shank 83 with pin 75 prior to installation on adapter 13 permits the lock to be adjusted to the release position in the event it is not already. The excavator swings the handling tool to the worked-on equipment and installs the new tip onto nose 20 of adapter 13. Once the new tip is fully seated on the nose, shank 83 is driven to move pin 75 inward to set lock 21 in the hold position. The shank 83 is pulled out of recess 87 by raising arm 81, and arms 61 spread to release the tip. If needed or desired, the worker can clean fines from the exposed nose 20 manually or by means on tool 25 prior to installation of new tip.

If intermediate adapter 13 needs replacing along with tip 15, the handling tool 25 can remove the worn adapter 13 before installing a new tip 15. Handling tool 25 is swung around 180° by turntable 43 to position tool head 37 opposite adapter 13. Tool head 37 includes a retention device 54 to securely hold adapter 13, and a lock operating device 56 to release the locks 21 holding adapter 13 to adapter 11. This tool head could alternatively be a separate handling tool to be engaged by the manipulator 10A.

In one embodiment, retention device 54 includes a support 93 that defines a cavity 95 to complement the shape of nose 20, though other arrangements to hold wear part 13 could be used (e.g., arms like for the tip or other means for contacting and holding specific portions of the nose). Support 93 can be a casing to define a closed cavity that substantially or fully encloses nose 20, or a more open framework to define a partial cavity that engages selected portions of the nose sufficiently to stably and securely hold and support the wear part by the nose. As another alternative, the support could be adjustable to receive different sizes or kinds of noses. In use, support 93 is received over the nose 20 with the nose received in the cavity 95.

Once the nose is fully seated in support 93, a retainer 97 is actuated to engage and hold nose 20 within support 93. In one example, retainer 97 is a rod 99 driven by a hydraulic cylinder 103 mounted on support 93 to contact nose 20. The rod 99 is movable into recess 77 in nose 20 (i.e., the same recess that receives the threaded pin 75 of lock 21) to hold the nose securely to support 93. Rod 99 is movable up and down by a hydraulic cylinder 103 but other actuators could be used. When the rod is in the up or retracted position, nose 20 can be inserted or removed from cavity 95. The rod is moved to the down or extended position to securely hold nose 20 and, hence adapter 13, to support 93. Other kinds of retainers could be used including those that use recess 77 and those that do not. As one example only, support 93 could be adjustable to shift inward and tightly hold at least certain surfaces of the nose.

Using the nose of a wear part (when available) to hold the wear part by itself or in concert with other means, can provide a stable and easily facilitated connection. The noses are designed to resist heavy loading when holding a wear part during an earth working operation such as digging, and are strong enough to provide support for the wear part. The noses commonly include fit surfaces that are maintained to relatively close tolerances, which can lead to an easier and more stable engagement by complementary surfaces on the support (i.e., within the cavity receiving the nose). Also, since the noses are generally covered by a wear part, they tend to experience less wear than other portions of the adapter. By using the nose, the handling tool can handle virtually any adapter including intermediate adapters (such as adapter 13) and base adapters (such as adapter 11) regardless of whether they are secured by locks, bolts, spool and wedge, weld, etc.

The lock operating device 56 of tool 25 is used to adjust locks 21 between their hold and release positions. In one embodiment, lock operating device 56 includes a pair of arms 105 and a lock-engaging device 107 at the end of each arm 105. Lock-engaging devices 107 engage and turn the pins 75 of locks 21 to move the pins between their hold and release positions. Each lock-engaging device 107 includes a shank 115 and a motor 117 supported by a housing 119. The free end 121 of each shank 115 has a hex shape to matingly fit in the recesses 87 of pins 75. Motors 117 rotate shanks 115 to adjust pins 75 in and out between the hold and release positions. Motors 117 are preferably hydraulic motors but other kinds of motors or methods of providing torque could be used.

Each arm 105 is secured to a sidewall 109 of support 93, though other arrangements are possible. Each arm 105 has a parallel linkage to pivotally move the respective shank 115 toward and away from each other while maintaining the shank 115 in a proper position to be received in the corresponding recesses 87, though other arrangements can be used. Arms 105 can be driven by hydraulic cylinders 113 but other actuators are possible. In one embodiment, there are no adjustments (other than the back and forth pivoting of arms 105) because the distance between the front end of nose 20 and the locks 21 in sidewalls 27 remains relatively unchanged, i.e., on account of the minimal wear that generally occurs on the front end of the nose. Accordingly, shanks 115 will ordinarily fit within recess 87 when nose 20 is fully seated in support 93. Nevertheless, an adjustment mechanism could be provided between arms 105 and support 93 (or elsewhere such as between arms 105 and lock-engaging devices 107) to enable adjustment of shanks 115 as needed or desired.

Once the rod 99 is firmly seated in the lock-receiving recess 77 in nose 20, arms 105 are moved inward so that shanks 115 are inserted into recesses 87 of locks 21, and driven to adjust locks 21 to their release positions. Once the locks 21 are released, the excavator boom 40 is operated to pull the intermediate adapter 13 from base adapter 11. As with the removal of tips 15, any fines inhibiting removal can be cleared manually or by tool 25. Once removed, the boom 40 moves handling tool 25 with adapter 13 to place the adapter in rack 90 or other location for disposal of the worn wear part. With the worn adapter in rack 90, the shanks 115 are withdrawn from locks 21 by separating arms 105, and rod 99 raised to release the wear part. The support 93 is then pulled from nose 20. Shanks 115 could be withdrawn at any time following adjustment of locks 21 to their release position.

A new intermediate adapter 13 can be then be installed on nose 17 of base adapter 11. The handling tool 25 is positioned by the excavator to place support 93 over nose 20 of a new adapter 13 in rack 90 or elsewhere. The retaining rod 99 is driven into the lock-receiving recess 77 in nose 20 to securely retain adapter 13 to support 93, i.e., with nose 20 in cavity 95. Lock-engaging devices 107 preferably engage locks 21 before installation on base adapter 11 in the event the locks need to be moved to the release position. The handling tool is then repositioned and adjusted to install adapter 13 on nose 17 of adapter 11. Once adapter 13 is fully seated on nose 17, the lock-engaging devices 107 are driven to adjust locks 21 to their hold position, after which time, shanks 115 and retainer 97 can be withdrawn.

In one embodiment, the handling tool further includes a coupling 123 (FIG. 15) for securing a ground-engaging wear part by rigging or a lifting eye. In this embodiment, the coupling is a clasp received in a recess 125 to permit easy connection to the wear parts without disrupting the ability of the handling tool to set stably on the ground. This can enable use of a single excavator to handle the parts either way without needing to un-install the handling tool. This combination of features provides versatility to engage, manipulate and move the wear parts. In one other embodiment, the coupling is in the form of a rod 127 across a recess 125 within the body of the handling tool. Other coupling arrangements could also be used.

Tools to connect to the manipulator can include an oscillator to shake the wear part. Fines that collect in spaces between the support and the wear part during digging operations can accrete to a consistency of concrete that binds the wear part to the support. Separating the wear part includes breaking the accretion to unbind the wear part which can require an exceptional level of force. Applying an oscillating force to the wear part can separate the accretions to ease removal of the wear part. An oscillator can operate in many different ways. In one example a mass is rotated off center of an axis. The oscillator can be mounted resiliently to a chassis or base such as by an elastomer mount or a spring to allow limited movement. Depending on the contact force and the type of contact with the wear part, different kinds of force can be applied to the wear part. The oscillator can be brought into contact with the wear part to apply an oscillating force. Alternatively, the oscillator can be slightly spaced from the wear part so as to repeatedly impact the wear part. The oscillator can be moved around the nose to impact the wear part and strike it at different points with force applied in different directions. The oscillator action is preferably applied at the forward portion of the wear part to apply a levering action to the bearing surfaces of the wear part socket and the nose of the support member received in the socket.

Alternatively, a handling tool 25 can function as an impactor on the wear part to separate the accretions. The tool can function in a similar way to a jack hammer with an extending chisel or head that is rapidly cycled to extend and strike the wear member. An impactor tool can also be used to set and release hammered locks. While threaded locks have been described above, locks that include components such as bevels and wedges can be used to secure a wear part to a support. The wedge is driven or hammered into an opening to bear against the wear part and support to hold the part to the support. Similarly at the end of the wear part's service life the wedge is driven out of the opening by impacting the other end of the wedge. An impactor handling tool can be used to set and remove hammered locks in the wear part.

Handling tools can include arc welding and oxyacetylene welding and cutting functions for maintaining wear parts on earth working equipment. A wear part in some situations can be most expeditiously removed by cutting it with a welding torch or can be secured to a support by welding the wear part to the support.

Handling tools can install and remove chemically activated locks. A wear part can be secured to a support by a lock formed by a chemical reaction. For example a wear part can be mounted to a support and the wear part and support include aligned openings. A handling tool can inject a reactive substance into the aligned openings. The reactive substance fills the aligned openings and sets to firm a rigid or semi-rigid component that conforms to the aligned openings and secures the wear part to the support. Alternatively, the tool can insert a rigid component in the aligned openings. The reactive substance is then injected in the openings to fill the space around the rigid component. Subsequently, at the end of the service life of the component the handling tool can inject a solvent that dissolves the reactive substance and releases the wear part from the support. The substance can be a material such as an epoxy, a polymer or an elastomer.

Wear parts can incorporate electronic systems for information sharing including identification, location and condition status. For example, locks inserted into holes of the wear part to secure the wear part to a base can include RFID tags. An RFID transponder can be located on earth working equipment which will periodically poll the RFIDs in each tooth on a lip of the bucket. When no signal is received from a tooth lock, an alert is sent to the operator to indicate a tooth has been lost from the bucket. Wear part data systems are taught in US20160237640 and US20160237657 which are hereby incorporated by reference in their entirety. The tools and remote system can determine location and identify a specific wear part by remote sensing of the electronic systems incorporated in the wear part. For example, an RFID tag in the lock of the wear part may be polled by the tool connected to the arm and its location in relation to the tool determined. The tool may retrieve an identification number or a condition status from the electronic system. The tool may triangulate or determine a location of the lock and a reference grid for the tool in relation to the wear part. The tool may communicate with more than one electronic system in the wear part assembly such as multiple lock systems with a system such as an RFID tag. Other identifiers (e.g., blue tooth signals, passive emitters or active emitters) can alternatively be used instead of RFID tags.

New wear parts can be provided on truck 1 by a rack as a carousel 90C as seen in FIG. 17. The carousel can include several compartments that hold the individual wear parts to be installed. The carousel can be controlled by processor 8 and rotate to indexed positions. When the tool 25 pulls a wear part from the carousel for installation, the carousel can rotate to an indexed position to present the next new wear part in the same position as the previous wear part. This allows the arm to access the same position each time to pull another part. The carousel can have one layer or can have multiple storage layers with more than one indexed position. Alternatively, the carousel can present an empty bin at the indexed position and the arm can place a used part removed from the earth working equipment in the empty bin. The carousel can then rotate to present a new wear part which the arm can pull for installation. Alternatively, the arm can place used wear parts in a bin 32 on the truck. At the end of an installation job the bin can be dumped to recycle the used parts. Library 14 for tools could be similarly configured as a carousel or cassette for dispensing the tools as indexed positions. Alternatively, a carousel can dispense wear parts and tools. Manipulator 10A of FIG. 17 can incorporate or be an intelligent assist device. The manipulator can function as an operator force multiplier. A load controlling force applied by the operator which is less than that required to actually move the load in an intended direction is applied to the load by the manipulator with adequate force to move the load in the intended direction. The manipulator of FIG. 1 can similarly incorporate IAD.

Figure 18:
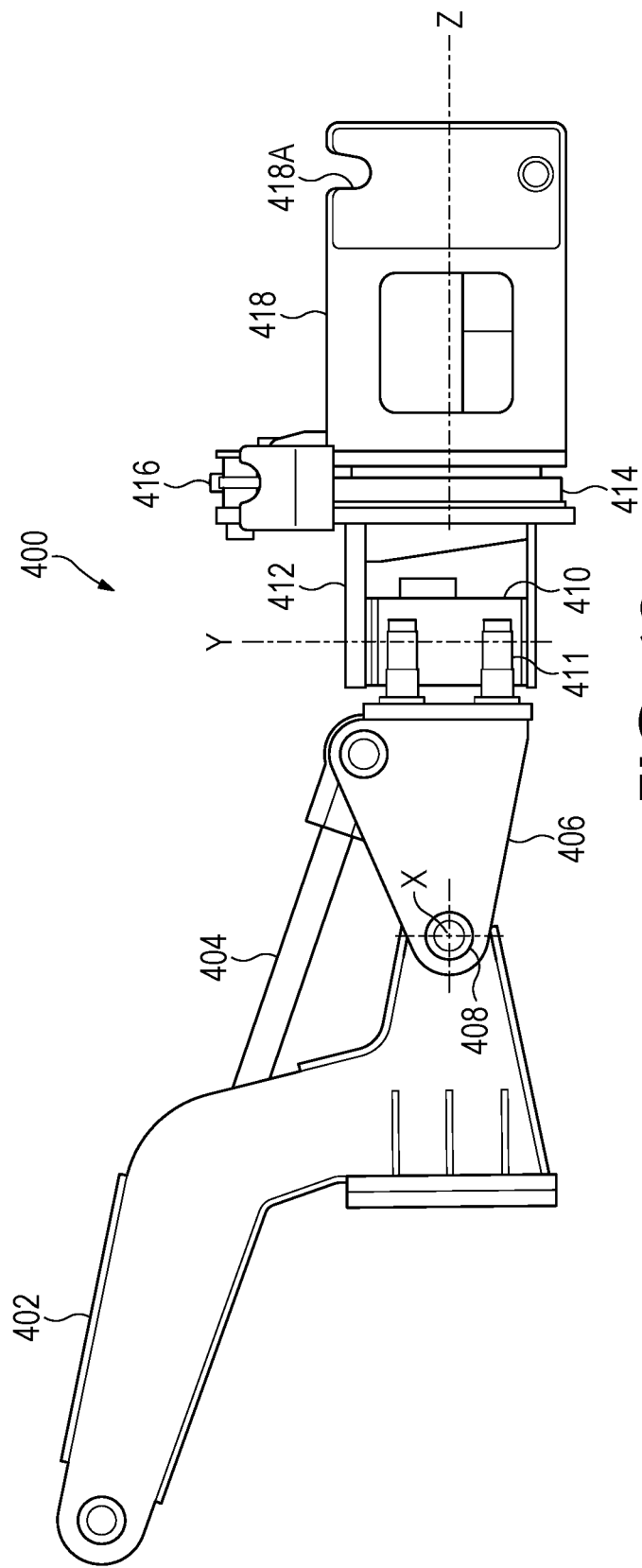
FIG. 18 is a side elevation view of a three axis joint.
Figure 18A:
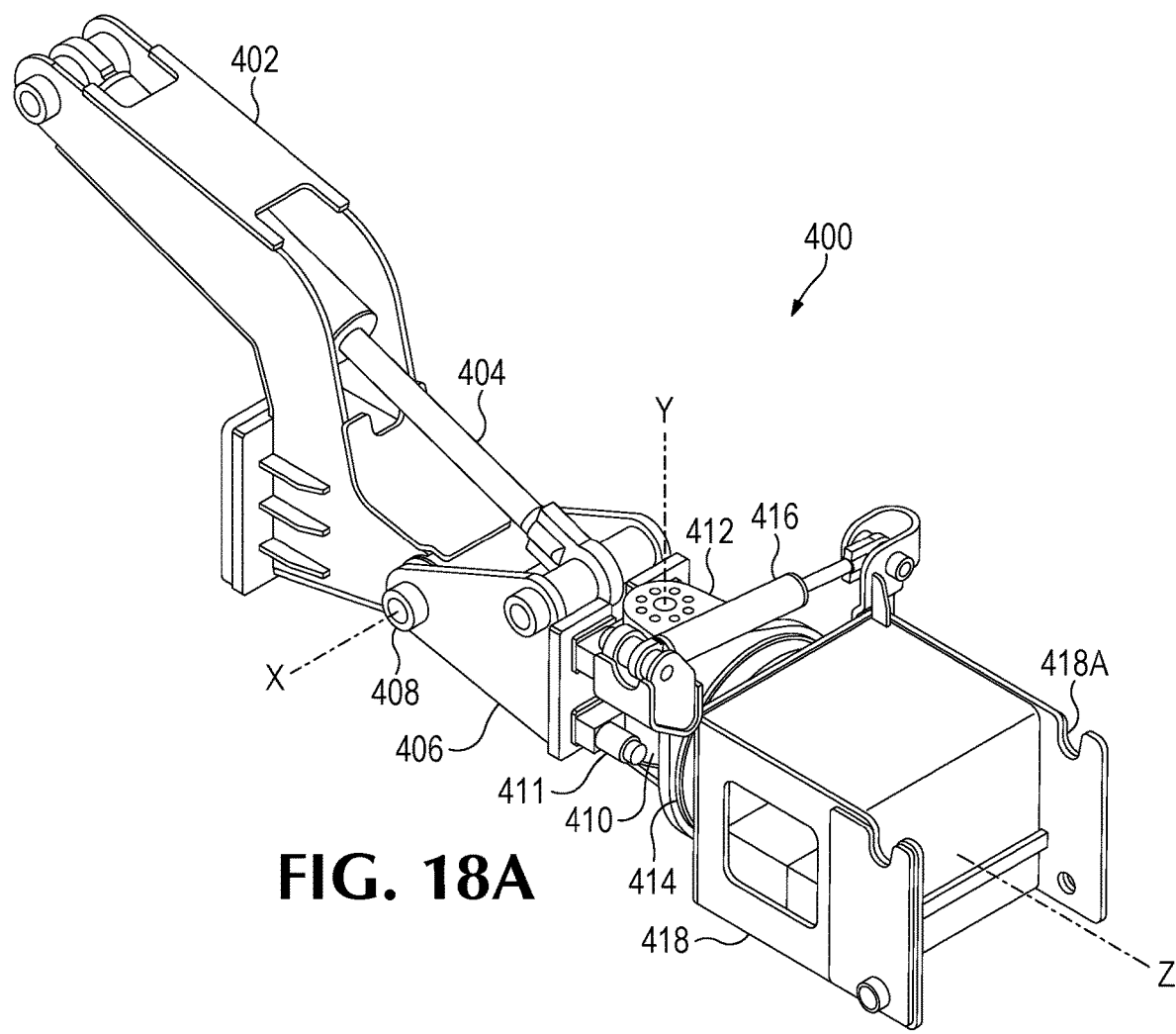
FIG. 18A is a perspective view of the three axis joint of FIG. 18.

Manipulator 10A can include a three axis joint assembly 400. In one embodiment, the manipulator in the form of an articulated arm in FIGS. 18 and 18A includes a segment 402 of joint assembly 400. Segment 402 is pivotally connected to a first bracket 406 at pin 408 and by an actuator 404 that controls pivotal movement of the bracket in relation to the segment. A second bracket 412 is pivotally connected to the first bracket 406 at pin 410. Pivotal movement of the second bracket is controlled by one or more actuators 411. The second bracket is attached to third bracket 418 by a turntable 414 whose motion is controlled by actuator 416. The distal end of the third bracket includes features acting as a socket 12 for connecting to a tool 25. The first bracket rotates about a first X axis at 408. The second bracket rotates about a Y axis at pin 410 and the third bracket rotates about a Z axis through the turntable 414. Each axis is orthogonal to the other axes in the orientation shown. As the joint assembly components move, the axes can form acute angles in relation to each other. The joint assembly 400 provides three axis movement for the tool 25 attached to the assembly connector 418A at the distal end of the third bracket 418. The joints can be controlled by hydraulic or other drives. The joint assembly positions the axes seriatim with adjacent brackets connected together to provide the desired motion to the handling tool. The joint assembly shown is an example for the purpose of illustration. Other configurations are possible with the components in different order in relation to each other and perform a similar function.

Handling tool 25 can be controlled by a remote device transmitting wireless communications to the handling tool. A receiver 2 and processor 8 are provided and can control the valves for the various hydraulic cylinders and motors. Other kinds of arrangements can be used particularly when other motors and actuators are used. This kind of control allows the worker to avoid contact with the wear parts and remain at a safe distance from the parts during a handling operation. Lasers (not shown) could be provided on the stations to provide sighting lines, which could help the operator position the shanks 83, 115 into the recesses 87 in the locks 21. Cameras could be provided on the stations 35, 37 (in addition to the lasers or on their own) to aid in the connection of the tool 25 to the wear parts.

Some or all of the actions of handling tool 25 could be fully or partially automated. The use of cameras 24 can also be used to assist the operator or fully automate the operation of the tool 25. Further, some of the processes could be manually performed. For example, with other constructions, the shanks could be manually guided by the worker into the hex recesses in the threaded pins of the lock and lifting eyes can be threaded into the lock opening by hand. While certain examples are provided above, handling tool 25 can be used to handle a wide variety of different ground-engaging wear parts. Various changes in the retention devices and lock operating devices could be made to accommodate the various sizes and kinds of wear parts to be handled.

Tool 25 could also collect and communicate data regarding the wear parts being installed and/or removed. The data could include, for example, photos of the wear parts, weight, torque required to install/remove, time required to install/remove, notification to personnel of the change out of wear parts, etc. Tool 25 could further communicate and/or receive data with or from sensors provided in the wear parts. The tool could provide data to the wear part sensors related, for example, to the change out date, time, location, duration, etc. of replacement of the wear parts. The tool could also receive data from the wear part sensors related to, for example, wear life, impact, performance, etc. such as disclosed in U.S. patent application Ser. No. 15/043,482 incorporated herein by reference in its entirety.

Earth working equipment is intended as a general term to refer to any of a variety of machines used in mining, construction and other earth moving activities, and which, for example, include dragline machines, cable shovels, face shovels, hydraulic excavators, loaders, bull dozers, dredge cutters, etc. The term earth working equipment also refers to the earth-contacting components of these machines such as the bucket, blade or cutter head. Relative terms such as front, rear, top, bottom and the like are used for convenience of discussion. For example, in the context of GET, front or forward are generally used to indicate the usual direction of travel during use (e.g., while digging), and upper or top are generally used as a reference to the surface over which the material passes when, for example, it is gathered into the bucket. Nevertheless, it is recognized that in the operation of various earth working machines the wear parts may be oriented in various ways and move in all kinds of directions during use.

The invention claimed is:

1. A handling system for ground-engaging wear parts for earth working equipment, the handling system comprising: a plurality of discrete handling tools each including a gripping assembly to grip and release a first or second wear part, wherein the gripping assembly of each of the handling tools includes a pair of movable arms and at least one actuator to selectively move the arms to grip and release the first or second wear part, wherein the gripping assembly of a first of the handling tools is suited to grip the first wear part and the gripping assembly of a second of the handling tools is suited to grip the second wear part, and wherein the second wear part is different than the first wear part;
a manipulator having a connector to separately engage and move each of the handling tools to engage a wear part for installing and/or removing the first or second wear part onto or from a base of the earth working equipment; and
a controller to control the movements of the manipulator and the handling tools.

2. The handling system of claim 1 wherein the gripping assembly of one of the handling tools engages a nose of the wear part.

3. The handling system of claim 1 wherein the manipulator includes a three-axis joint supporting the handling tool wherein the three axes are spaced apart and arranged seriatim to each other.

4. The handling system of claim 3 including a hydraulic drive to power the handling tool and the manipulator.

5. The handling system of claim 1 wherein at least one of the handling tools includes a lock release device movable to contact and release a lock securing the wear part to the base.

6. The handling system of claim 5 wherein the lock release device includes a rotary drive to turn a threaded component in the lock.

7. A handling system of claim 1 wherein the gripping assembly for each of the handling tools includes a support to engage a front end of the wear part.

8. The handling system of claim 1 wherein the second wear part has a different size than the first wear part.

9. The handling system of claim 1 wherein the second wear part has a different design than the first wear part.

10. A handling system for ground-engaging wear parts for earth working equipment, the handling system comprising:
a handling tool including bearing surfaces for engaging a nose on the wear part and a support for engaging and releasing a lock opening in the nose to hold the wear member, and a lock release device movable to contact and release a lock securing the wear part to the base, the lock release device including a rotary drive to turn a threaded component in the lock;
a manipulator to support and move the handling tool to engage the wear part, and install and/or remove the wear part onto or from a base; and
a controller to control the movements of the handling tool and the manipulator.

11. The handling system of claim 10 wherein the manipulator includes a three-axis joint supporting the handling tool wherein the three axes are spaced apart and arranged seriatim to each other.

12. The handling system of claim 11 including a hydraulic drive to power the handling tool and the manipulator.

13. The handling system of claim 10 including a second handling tool fora second wear part of a different style, the second handling tool including a gripping assembly for gripping and releasing the second wear part.

14. The handling system of claim 13 wherein the manipulator includes a connector to alternatively engage each of the handling tools.

15. The handling system of claim 13 wherein the two handling tools are joined to a single chassis capable of moving the handling tools alternatively into position to engage a wear part.

16. A handling system for ground-engaging wear parts for earth working equipment, the handling system comprising:
- a manually-operated manipulator incorporating an operator force multiplier; and
- a handling tool connected to the manipulator and having a gripping assembly to hold and release a wear part for removal and/or installation of the wear part from and/or onto earth working equipment, the gripping assembly including a pair of movable arms, and at least one actuator to selectively move the arms to grip and release the wear part;

wherein the manipulator is a crane with a tool balancer.

17. The handling system of claim 16 wherein the handling tool includes a support to engage the wear part.

18. The handling system of claim 16 including a plurality of discrete handling tools, wherein the manipulator includes a connector to separately engage and move each of the handling tools to engage a wear part.

* * * * *